United States Patent
Henry et al.

(10) Patent No.: US 10,808,694 B2
(45) Date of Patent: Oct. 20, 2020

(54) SYSTEMS AND DEVICES FOR PUMPING AND CONTROLLING HIGH TEMPERATURE FLUIDS

(71) Applicant: Georgia Tech Research Corporation, Atlanta, GA (US)

(72) Inventors: Asegun Henry, Atlanta, GA (US); Caleb Amy, Atlanta, GA (US); Malavika Bagepalli, Atlanta, GA (US); Daniel Budenstein, Atlanta, GA (US); Diane England, Atlanta, GA (US); Colin Kelsall, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 206 days.

(21) Appl. No.: 15/677,801

(22) Filed: Aug. 15, 2017

(65) Prior Publication Data
US 2018/0045197 A1    Feb. 15, 2018

Related U.S. Application Data

(60) Provisional application No. 62/374,941, filed on Aug. 15, 2016.

(51) Int. Cl.
*F04C 2/08* (2006.01)
*F04C 15/00* (2006.01)
(Continued)

(52) U.S. Cl.
CPC ............... *F04C 2/084* (2013.01); *F04C 2/18* (2013.01); *F04C 13/00* (2013.01); *F04C 15/0003* (2013.01); *F04C 15/0073* (2013.01)

(58) Field of Classification Search
CPC ...... F04C 13/00; F04C 2/084; F04C 15/0073; F04C 2/18
See application file for complete search history.

(56) References Cited

U.S. PATENT DOCUMENTS 2,096,490 A * 10/1937 Thore ............... F04C 2/126
418/206.7
2,479,077 A * 8/1949 McAlvay ............ F04C 15/0042
418/73
(Continued)

FOREIGN PATENT DOCUMENTS

WO    2015023847    2/2015

OTHER PUBLICATIONS

Gutierrez, Alejandro U., "Electromagnetic Pumps for Liquid Metals," Calhoun Institutional Archive of the Naval Postgraduate School, 1965; Dudley Knox Library, Monterey, CA.
(Continued)

*Primary Examiner* — Christopher S Bobish
(74) *Attorney, Agent, or Firm* — Troutman Pepper Hamilton Sanders LLP; Ryan A. Schneider

(57) ABSTRACT

The disclosed technology includes pumps, pipes, valves, seals, and systems for pumping and controlling high temperature fluids, such as liquid tin, at temperatures of between 1000-3000° C. The systems and device may be partially or entirely constructed using brittle materials, such as ceramics, that are capable of withstanding extreme heat without significantly degrading, and may be secured using components made of refractory metals, such as tungsten. The systems and devices may utilize static and dynamic seals made from brittle materials, such as graphite, to enable the high temperature operation of such pumps, pipes, valves, and systems without leakage.

22 Claims, 15 Drawing Sheets

(51) Int. Cl.
*F04C 13/00* (2006.01)
*F04C 2/18* (2006.01)

(56) References Cited

U.S. PATENT DOCUMENTS

| | | | | | |
|---|---|---|---|---|---|
| 2,633,083 | A | * | 3/1953 | Smith | F04C 2/084 418/102 |
| 2,696,170 | A | * | 12/1954 | Francis | F04C 2/102 417/201 |
| 2,833,224 | A | * | 5/1958 | Meyer | F04C 2/084 418/83 |
| 3,014,432 | A | * | 12/1961 | Lateef | B22D 39/00 417/147 |
| 3,255,702 | A | * | 6/1966 | Gehrm | F04D 7/065 415/197 |
| 3,510,230 | A | * | 5/1970 | Raub | F04D 29/167 415/174.2 |
| 3,612,715 | A | * | 10/1971 | Yedidiah | F04D 7/065 415/131 |
| 3,881,849 | A | * | 5/1975 | Commarmot | F04C 2/084 418/182 |
| 3,976,405 | A | * | 8/1976 | Geiger | F04C 13/001 418/102 |
| 4,265,602 | A | * | 5/1981 | Teruyama | F04C 15/0088 418/1 |
| 4,549,862 | A | * | 10/1985 | Stich | F01C 21/10 418/133 |
| 5,190,450 | A | * | 3/1993 | Ghosh | F01C 21/02 384/114 |
| 5,569,024 | A | * | 10/1996 | Dummersdorf | F04C 15/0069 277/431 |
| 6,206,667 | B1 | * | 3/2001 | Turner, Jr. | F04C 2/082 417/218 |
| 6,612,821 | B1 | * | 9/2003 | Kuijpers | F04C 2/14 418/152 |
| 9,366,250 | B1 | * | 6/2016 | Takeda | F04C 2/18 |
| 9,567,999 | B2 | * | 2/2017 | Ferretti | F04C 2/084 |
| 10,400,766 | B2 | * | 9/2019 | Murata | F04C 2/14 |
| 2009/0060770 | A1 | * | 3/2009 | Okada | F04C 2/084 418/206.5 |
| 2009/0208357 | A1 | * | 8/2009 | Garrett | F04C 2/18 418/152 |
| 2017/0268503 | A1 | * | 9/2017 | Branczeisz | F02G 5/02 |
| 2019/0226478 | A1 | * | 7/2019 | Afshari | F04C 2/084 |

OTHER PUBLICATIONS

Creative Engineers, Inc., "Flat Linear Induction Pumps," www.creativeengineers.com; Jun. 1, 2015.
Barth, Daniel L., "High Temperature Molten Salt Pumps," Practice & Operations, Apr. 2007, pp. 98-101.
Smith, P. G., "Experience with High-Temperature Centrifugal Pumps in Nuclear Reactors and Their Applicaton to Molten-Salt Thermal Breeder Reactors," Oak Ridge National Laboratory, Sep. 1967.
Farris, Edsel S., "Summary of high Temperature, Liquid Metal, Fused Salt Pump Development Work in teh ORNL-ANP Project for the Period Jul. 1950-Jan. 1954," Oak Ridge School of Reactor Technology, Aug. 1954.
"A.C. Electromagnetic Conduction Pumps," Creative Engineers, www.creativeengineers.com Jun. 1, 2015.
"SJT-VCN Molten Salt Circulation Pumps for Concentrated Solar Power," Sulzer Pumps brochure, 2013.

\* cited by examiner

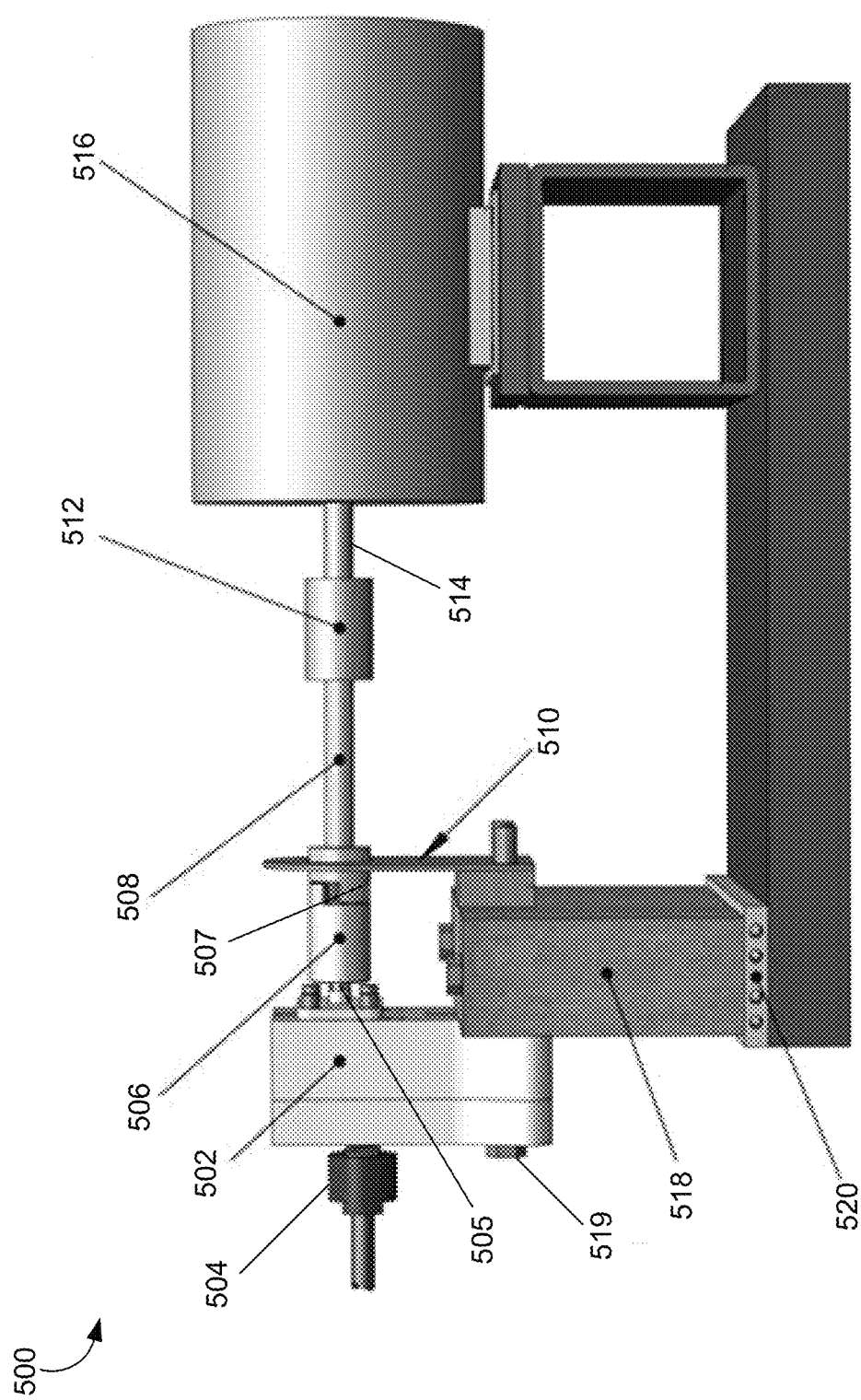

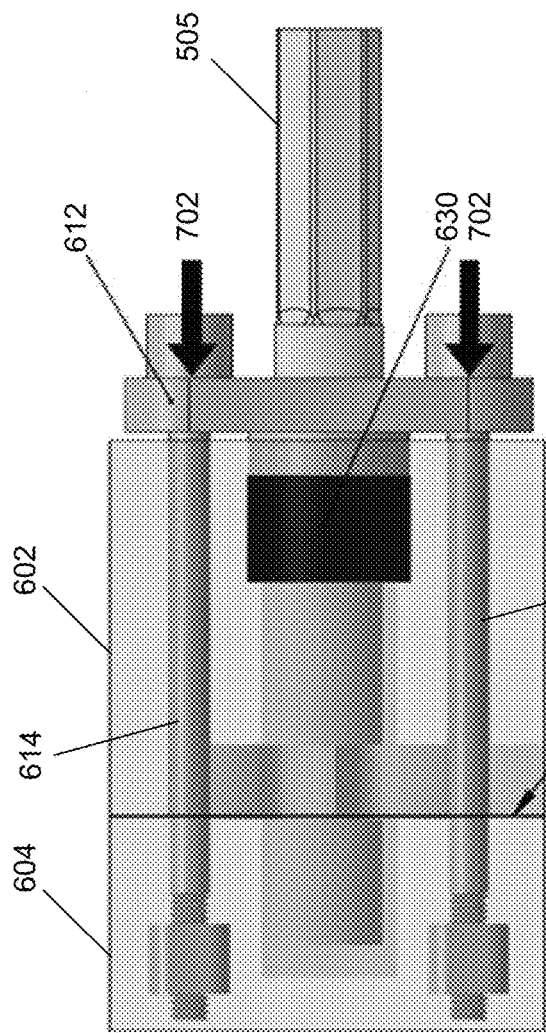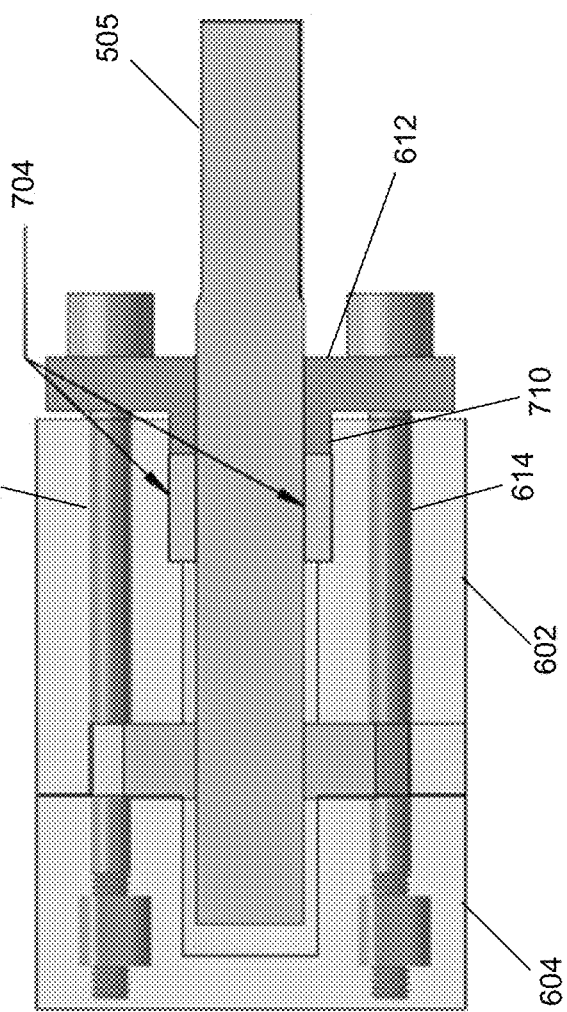

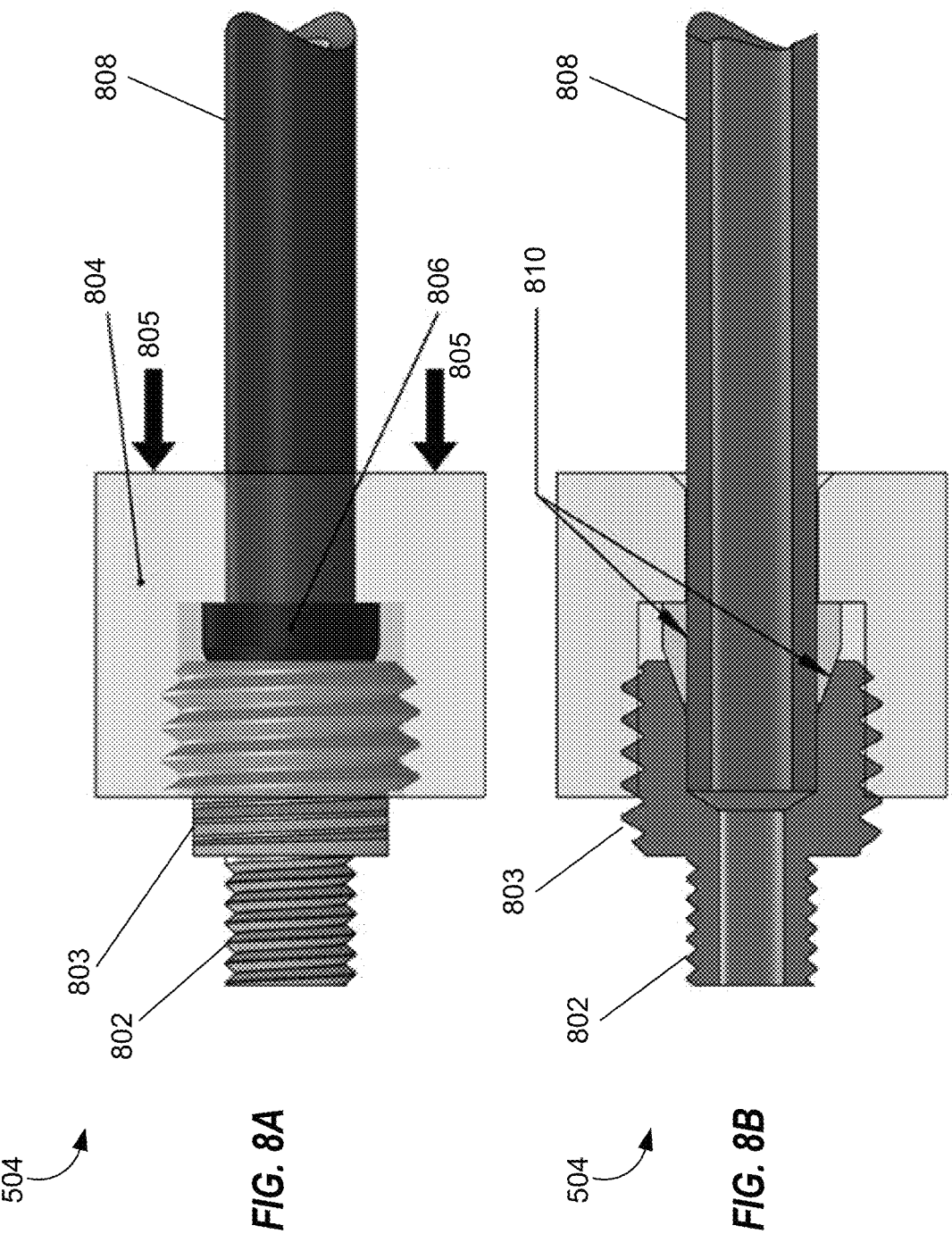

SYSTEMS AND DEVICES FOR PUMPING AND CONTROLLING HIGH TEMPERATURE FLUIDS

CROSS-REFERENCE TO RELATED APPLICATIONS

This application claims priority to, and the benefit under 35 U.S.C. § 119(e), of U.S. Provisional Patent Application No. 62/374,941, filed 15 Aug. 2016, the entire contents and substance of which are hereby incorporated by reference as if fully set forth below.

STATEMENT OF RIGHTS UNDER FEDERALLY-SPONSORED RESEARCH

This invention was made with government support under contract number DE-AR0000339, awarded by the Department of Energy. The government has certain rights in this invention.

BACKGROUND

Thermal energy is very useful in power generation and many other industrial processes. Thermal energy has its greatest value in these industrial processes when it can be transported, stored, and converted at the highest possible temperatures. There are many applications in which it would be desirable to manipulate heat at very high temperatures (i.e., temperatures above 1,000° C.). However, with the exception of gas turbines and rocket engines, this has proven to be impractical. Further, even in these cases where hot gases are flowing, the gas is not pressurized/pumped when it is hot and neither of these scenarios involve the use of liquids. Rather, in these systems, the pumps and compressors are kept in a relatively cold portion of the system, transmitting mechanical force through the fluid. This separation of dynamic components from high temperature fluids can be attributed to difficulties from materials limitations, as there are only a few classes of materials that remain solid, chemically stable, and/or can exhibit long life at temperatures above 1,000° C.

The optimum heat transfer media for high temperatures is molten metals because they can have a low viscosity near their melting point, they have high electrical and thermal conductivity, which can result in 2-3 orders of magnitude increase in the heat transfer coefficient compared to non-electrically conductive fluids (like oils and salts), and they can have a large liquid range that may enable single phase operation. For example, tin is liquid between 232-2,603° C. Further, molten metals are abundant, inexpensive, and are mass produced making them readily available for use in such applications. These desirable properties enable compact and high volumetric power density heat transfer and thermal storage. By contrast, other materials such as molten salts/glasses, fluidized solids, gasses, and radiation have various disadvantages including low temperature limits, high pumping requirements due to high viscosity and low thermal conductivity, geometric constraints, and low density. However, liquid metal heat transfer may not be suitable for traditional pumping and control systems made of metallic components. For example, liquid tin dissolves or reacts with nearly all metals. Further, at high temperatures, mass diffusion and reaction kinetics are highly accelerated, so traditional piping/containment infrastructures made of conventional structural metals may degrade rapidly when handling high temperature liquid tin.

Accordingly, high temperature fluid handling technologies, specifically for liquids, have long been limited to temperatures below approximately 700° C. Above approximately 700° C., the metals used to make the pump and valve bodies often weaken or suffer thermal fatigue. The seals used in such pumps and valves also often begin to react with high temperature liquids or are simply thermally unstable (i.e., they melt/vaporize or decompose) and cannot be used at such high temperatures. Furthermore, the pump and valve bodies sometimes also suffer thermal shock due to inadequate heating prior to introduction of hot liquids. Moreover, the extreme thermal gradients in the system, and mismatch of the coefficient of thermal expansion (CTE) of various materials, has made protecting electronics while maintaining alignment very challenging. All of these issues have made the idea of pumping liquid metals at extreme temperatures (i.e., greater than 1000° C.) either impossible or impractical for commercial applications.

Therefore, there exists the need for systems and devices that do not suffer from the aforementioned problems that have traditionally rendered high temperature fluid pumping systems impractical, that that can efficiently pump and control liquid metals at temperatures in excess of 1000° C. to enable the construction of new applications such as high-temperature nuclear power generation, solar fuel applications, high energy thermal energy storage, and other such industrial applications that depend on the efficient transport of such extremely hot liquid metals.

SUMMARY

Some or all of the above deficiencies may be addressed by certain embodiments of the disclosed technology. Disclosed embodiments provide systems for pumping and controlling high temperature liquids, with some embodiments enabling temperatures at high as 3000° C.

Consistent with the disclosed embodiments, a pump for pumping at least one of liquids and gases at temperatures between 500° C. and 3000° C. may be formed at least in part from at least one brittle material. The pump may be comprised of a first brittle material and may have a seal comprised of a second brittle material. The pump may further comprise stationary components sealed by a static seal comprised of the second brittle material and moveable components sealed with a dynamic seal comprised of the second brittle material. The pump may comprise a pump body made of the first brittle material, wherein the pump body comprises a closed face having an aperture for receiving a shaft, an open face, a chamber disposed between the closed face and the open face, the chamber housing at least a first gear that is attached to the shaft, and a first plurality of apertures for receiving securing members. The pump may further comprise a first plate positioned externally to the closed face of the pump body, wherein the first plate is made of the first brittle material or a refractory metal and has an aperture for receiving the shaft and a second plurality of apertures for receiving securing members. The pump may further comprise a plurality of securing members that are disposed in the first and second plurality of apertures to secure the first plate to the pump body, wherein the plurality of securing members are made of a refractory metal. The pump may further comprise a second plate made of the first brittle material, the second plate attached to the pump body at the open face such that the chamber is enclosed, wherein the second plate comprises a fluid inlet in communication with a first side of the chamber and a fluid outlet in communication with a second side of the chamber.

According to some embodiments, the first brittle material may be a ceramic and the second brittle material may be graphite. According to some embodiments, the refractory metal may be tungsten. In some embodiments, a packing seal may be positioned around a portion of the shaft positioned within the chamber to form a seal between the shaft and an internal surface of the pump body. In some embodiments, the packing seal may be configured to be tightened in response to a tightening of the plurality of securing members. In some embodiments, the packing seal may comprise packing rope wound around the shaft. In some embodiments, the packing rope may be a soft and compressible graphite. According to some embodiments, the pump may further comprise a fluid connection adapter attached to the second plate, wherein the fluid connection adapter is made of a brittle material and comprises a first thread configured to be attached to the fluid inlet or fluid outlet, wherein the first thread is hollow. The fluid connection adapter may further comprise a second thread that comprises an aperture configured to receive the end of a pipe having a graphite ferrule that is configured to expand radially to form a seal between the pipe and the second thread in response to an axial force and threading configured to receive a nut.

In another embodiment, valve for controlling the flow of at least one of liquids and gases at temperatures between 500° C. and 3000° C. may include a valve body comprising a hollow chamber and being made of a first brittle material and a rotatable valve member made of the first brittle material, wherein the rotatable valve member is positioned within the valve body. In some embodiments, the valve body may have a first aperture and the valve may further comprise a tapered stem plug that comprises the rotatable valve member, wherein the tapered stem plug has a second aperture, the tapered stem plug is rotatably positioned within the hollow chamber of the valve body such that the first and second apertures may be concentrically aligned when the tapered stem plug is rotated to an open position, and the tapered stem plug is attached to a first end of a packing nut. The valve may further comprise a shaft made from the first brittle material, wherein the shaft is attached to a second end of the packing nut. The valve may further comprise a packing seal made of a second brittle material, wherein the packing seal is positioned around a portion of the tapered stem plug adjacent to the first end of the packing nut.

In some embodiments, the both the first and second brittle materials comprising the valve may be graphite. In some embodiments, the packing seal may be configured to expand radially to form a seal between the tapered stem plug and the chamber in response to an axial force from the packing nut. In some embodiments, the shaft may be in communication with an actuator that is configured to drive rotation of the shaft to rotate the tapered stem plug between an open and a closed position. In some embodiments, the actuator may be distanced from the valve such as to thermally isolate the actuator from the valve such that the actuator is configured to operate at ambient temperatures between 0° C. and 300° C. while the valve is configured to simultaneously operate at a high temperature range of between 500° C. and 3000° C.

In another embodiment, pump and motor system for pumping at least one of liquids and gases at temperatures between 500° C. and 3000° C. is disclosed. The system may comprise a pump made of brittle materials and that is configured to operate a high temperature range of between 500° C. and 3000° C. The system may further comprise a motor configured to operate at ambient temperatures between 0° C. and 300° C. The system may further comprise a shaft that mechanically connects the pump to the motor, wherein the pump is distanced from the motor such as to thermally isolate the pump from the motor such that the motor operates in the ambient temperature range while the pump simultaneously operates in the high temperature range. In some embodiments, the pump may comprise a gear attached to a pump shaft extending out of a body of the pump and the pump shaft may terminate in a first coupler. In some embodiments, the system may further comprise a motor shaft attached to the motor, an insulating shaft positioned between the pump shaft and the motor shaft, wherein the insulating shaft comprises a second coupler configured to rotatably engage the first coupler of the pump shaft, a flexible joint that attaches the insulating shaft to the motor shaft, and a bearing mount that comprises a plate with an aperture configured to support the insulating shaft, wherein the bearing mount enables insulating shaft to be angularly flexible but axially constrained.

According to some embodiments, the pair of engage couplers may be jaw type couplers that are configured to accommodate thermal growth mismatch radially and axial and angular misalignment. In some embodiments, the pump of the system may comprise a body, a faceplate, and a pair of gears made from a brittle material and a plurality of attachment members made from a refractory metal. In some embodiments, the pump of the system may further comprise a graphite seal disposed between the body and the faceplate and a graphite packing seal disposed around a portion of the shaft that is internal to the body. According to some embodiments, the system may further comprise a pump base configured to support the pump and the bearing mount, wherein the pump base may be made of an insulating, refractory, high strength material, and a cold plate positioned adjacent to the pump base. In some embodiments, the flexible joint may be configured to bend to accommodate a misalignment between the motor shaft and the insulating shaft caused by thermal growth of components of the system. In some embodiments, the motor may be positioned relative to the pump such that the motor shaft exits the motor at first height and the pump shaft exists the pump at a second height, wherein the first height is higher than the second height. According to some embodiments, the system may further comprise a chamber encompassing one or more of the pump, the motor, the insulating shaft, the flexible joint, and the bearing mount, the chamber having polymer seals and being filled with gas that has been selected for chemical compatibility with one or more of the components of the pump, the motor, the insulating shaft, the flexible joint, and the bearing mount.

Other embodiments, features, and aspects of the disclosed technology are described in detail herein and are considered a part of the claimed disclosed technology. Other embodiments, features, and aspects can be understood with reference to the following detailed description, accompanying drawings, and claims.

BRIEF DESCRIPTION OF THE FIGURES

Reference will now be made to the accompanying figures and flow diagrams, which are not necessarily drawn to scale, and wherein:

FIG. 5 is a side view of a high temperature gear pump and motor system, according to an example embodiment.

FIG. 7A is a side view of an internal portion of a high temperature pump having a packing seal, according to an example embodiment. FIG. 7B is a cross-sectional side view of the internal portion of a high temperature pump having a packing seal, according to an example embodiment.

FIG. 8A is a side view of a fluid connection adapter, according to an example embodiment. FIG. 8B is a cross-sectional side view of a fluid connection adapter, according to an example embodiment.

DETAILED DESCRIPTION

Figure 1:
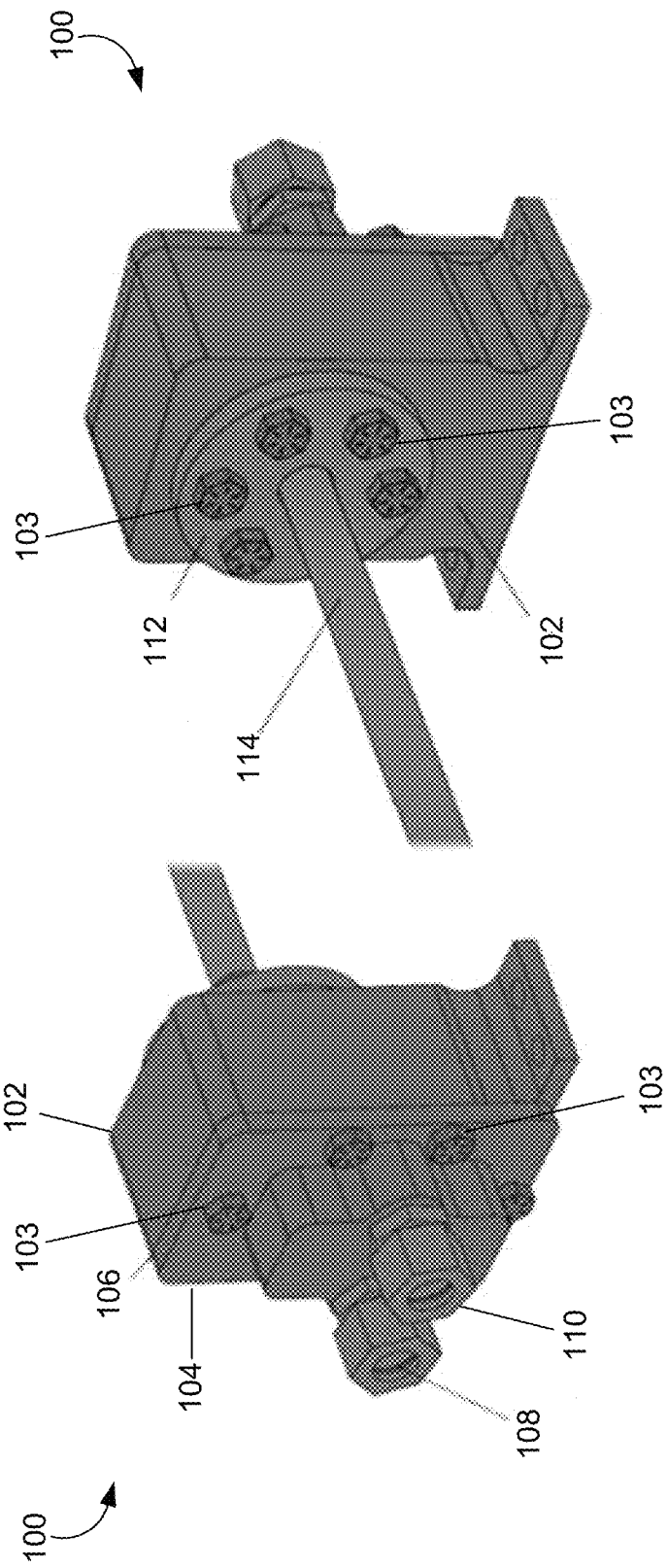
FIGS. 1A-1B are front and rear perspective views of a high temperature gear pump, according to an example embodiment.

As described herein, embodiments of the disclosed technology include pumps, valves, seals, and systems for pumping and controlling high temperature fluids such as liquid tin at temperatures greater than 1000° C. In particular, embodiments of the disclosed technology may include pumps, valves, seals, and pumping systems that utilize mechanical components made from brittle materials, such as ceramics (i.e., inorganic non-metallic materials). Unlike mechanical components traditionally made from metal, mechanical components made from ceramics may not suffer from thermal fatigue from extended exposure to the high temperature fluids. Further, ceramics with high conductivity and low thermal expansion may not suffer from thermal shock due to inadequate heating prior to the introduction of high temperature fluids. Some embodiments of the disclosed technology include improved seals that may resist melting, vaporization, or decomposition when exposed to high temperature liquids. Furthermore, embodiments of the disclosed technology may include systems and devices that are configured to substantially negate the effects of extreme thermal gradients or mismatching of the CTE of various materials found in more traditional designs.

According to some embodiments, the disclosed technology may relate to designs for pumps, valves, seals, and pumping systems that utilize mechanical components made from brittle materials, such as ceramics. In some embodiments, the particular ceramics used may be selected to be thermodynamically compatible with the fluids being handled. For example, liquid tin may be handled by graphite, alumina, zirconia, silicon carbide, aluminum nitride, and many other materials. Liquid tin may be particularly useful as a heat transfer fluid as it is also thermodynamically compatible with tungsten metal, which may be used to provide non-brittle support and structure to the devices and systems described herein. Other embodiments may use Sn, Ga, In, Si and Al as the high temperature fluid, paired with graphite. Some embodiments may use Sn, Ga, In, Si, Al, Fe, Ni as the high temperature fluid paired with alumina, zirconia, aluminum nitride, zirconium carbide, or silicon nitride. It should be understood that these pairings are exemplary only and that other such thermodynamically compatible pairings of liquids and brittle materials may be used. In some embodiments, any low melting point metal may be used as the high temperature fluid, which may also include Pb and Bi. Other examples of potential brittle or ceramic materials that may be used as structural materials may include SiC, MgO, and Al3C4. According to some embodiments, graphite may be used for piping, joints, and seals, while a refractory metal, such as tungsten, may be used where tensile forces are needed, which may include components such as bolts, brackets, nuts, packing seal flange, shaft, or shaft support bearing. In some embodiments, pumps may be made from a machinable aluminum nitride-rich material (e.g., 80% AlN/20% BN) that has a similar coefficient of thermal expansion as graphite to enable reliable joints between the two.

Embodiments of the disclosed technology may also relate to the use of improved seals. In general, seals require a deformable material, which when subjected to an applied force will deform in such a way as to fill the microscopic gaps that would exist between mating surfaces, due to the inherent roughness of each mating surface. Accordingly, the deforming of the material may prevent fluid from leaking between the microscopic crevices that exist between mechanical parts that are experiencing motion relative to one another. For example, an inner surface of the body or faceplate of a pump and the surface of the shaft as the shaft rotates within an aperture of the body or faceplate may be sealed by a packing seal. Embodiments of the disclosed technology may relate to seals made from refractory materials (i.e., materials that can remain in a solid state at high temperatures) that may become soft and/or pliable at high temperatures in order to form a seal such as for example, graphite, boron nitride, other fibers such as fibers made from alumina, ceramic materials, or other such materials.

According to some embodiments, any of the pipes, pumps, values, motors, or systems described herein may be configured to operate in an inert gas environment to prevent oxidation of components or fluid used. For example, an inert $N_2$ environment may be used to prevent oxidation of tin. Other gas environments that may be used include, but are not limited to a vacuum, argon, helium, krypton, or other noble gases. Accordingly, in some embodiments, some or all of the components, pipes, pumps, valves, motors, and systems described herein may be encased in a gas-filled container. In some embodiments, a container may be made from steel and may have polymer seals. In some embodiments, the container may be filled with nitrogen gas. In some embodiments, the gas may be selected for chemical compatibility with the components of the pumps, valves, or pump and motor systems described herein.

Throughout this disclosure, certain embodiments are described in exemplary fashion in relation to systems and device for pumping and controlling the flow of very high temperature liquids, and in particular liquid metals such as tin. However, embodiments of the disclosed technology are not so limited. In some embodiments, the disclosed technique may be effective in pumping and controlling the flow of other high temperature materials such as other metals, salts, oxides/glasses, and gases. The disclosed technology may also be used to move other problematic liquids such as acids, bases, hot petroleum products, hot polymer melts, high temperature heat transfer oils, molten salts, molten glass, and molten metals. Although this disclosure generally describes the construction of mechanical components from ceramics, it should be understood that other brittle materials with similar qualities could be used, such as graphite (which is not always considered to be a ceramic), refractory metals such as tungsten, molybdenum, rhenium, Niobium, or Tantalum, and materials that may be classified as semiconductors, such as sulfides, phosphides, or silicides, and where the use of ceramics is described herein, it is contemplated that such other brittle materials may alternatively be used. Further, although this disclosure is generally directed towards the use of an external gear pump, the techniques described herein may also be employed using centrifugal, axial, internal gear pumps, sump pumps, electromagnetic pumps, mechanical pumps, and any other positive displacement, impulse, or velocity pump.

Some embodiments of the disclosed technology will be described more fully hereinafter with reference to the accompanying drawings. This disclosed technology may, however, be embodied in many different forms and should not be construed as limited to the embodiments set forth therein.

In the following description, numerous specific details are set forth. However, it is to be understood that embodiments of the disclosed technology may be practiced without these specific details. In other instances, well-known methods, structures, and techniques have not been shown in detail in order not to obscure an understanding of this description. References to "one embodiment," "an embodiment," "example embodiment," "some embodiments," "certain embodiments," "various embodiments," etc., indicate that the embodiment(s) of the disclosed technology so described may include a particular feature, structure, or characteristic, but not every embodiment necessarily includes the particular feature, structure, or characteristic. Further, repeated use of the phrase "in one embodiment" does not necessarily refer to the same embodiment, although it may.

Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

Unless otherwise specified, the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Various systems and methods, are disclosed for pumping and controlling high temperature fluids, and will now be described with reference to the accompanying figures.

FIGS. 1A-1B show a high temperature gear pump 100, according to an example embodiment. High temperature gear pump 100 may include a body 102 and a faceplate 104 that may encase the inner workings of the device, when attached together. According to some embodiments, faceplate 104 may be secured to body 102 by one or more securing members 103, such as bolts, pins, screws, and the like. According to some embodiments, securing members 103 may be made from a refractory metal, such as steel, tungsten, molybdenum, alloys with some amount of rhenium. Nickel-based super alloys may also be used at temperatures up to approximately 800° C. When secured together, body 102 and faceplate 104 may form a seal 106. High temperature gear pump 100 may include a fluid inlet 108 for receiving high temperature fluid, such as liquid tin, and a fluid outlet 110 for expelling the high temperature fluid. In some embodiments, gear pump 100 may include a gland plate 112 mounted on the rear face of body 102. Gland plate 112 may have an aperture that is configured to receive a rotatable shaft 114 that may further pass through an aperture of body 102 (not shown) so that it may connect to internal components of high temperature gear pump 100 to drive the gear pump's operation. According to some embodiments, and as explained in greater detail below with respect to FIGS. 7A-7B, gland plate 112 may interact with a packing seal positioned around shaft 114 to create a dynamic seal between the rotatable shaft 114, body 102, and/or the gland plate 112 to prevent leakage of high temperature fluid. According to some embodiments, shaft 114 may be made from, for example but not limited to, steel, Inconel 625, Inconel 740, or refractory metals such as Mo or W based alloys. For example, Inconel 625 may be used for temperatures up to approximately 600° C. or Inconel 740 may be used for temperatures up to approximately 800° C.

Figure 2:
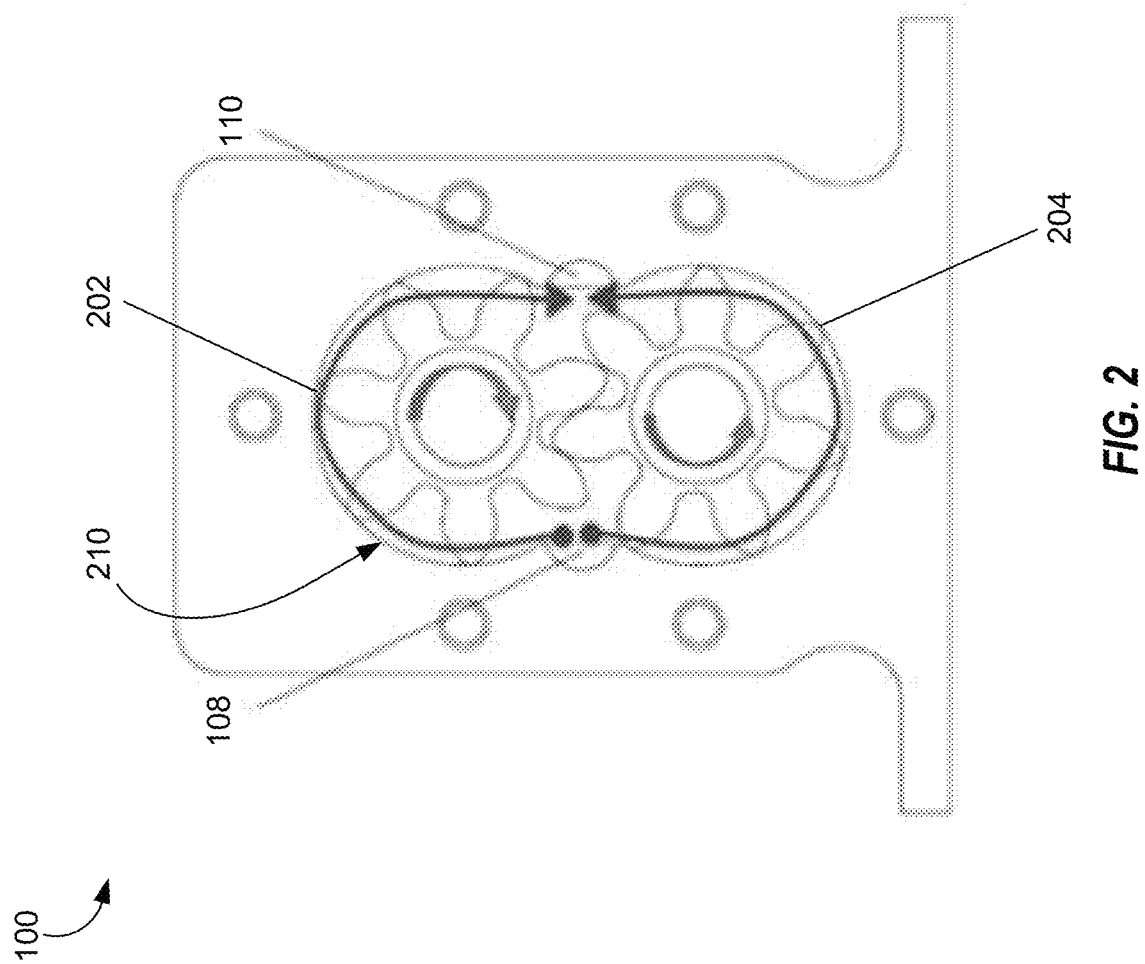
FIG. 2 is a cross-sectional front view of a high temperature gear pump showing the fluid path, according to an example embodiment.

As shown in FIG. 2, high temperature gear pump 100 may have an internal chamber 210 that houses a first gear 202 and a second gear 204. Each of first gear 202 and second gear 204 may have a plurality of teeth. In some embodiments, the teeth of first and second gears 202, 204 may have a large radius edges to minimize stress concentrations when the gears 202, 204 rotatably engage one another. For example, in some embodiments, the teeth of first and second gears 202, 204 may be designed with a full radius fillet dedendum instead of the minimum radius that results from standard tooling. In some embodiments, the radius of the teeth of first and second gears 202, 204 may be up to five times greater than the radius of teeth that results from standard tooling. According to some embodiments, fluid inlet 108 may be configured to direct high temperature fluid into internal chamber 210 and fluid outlet 110 may be configured to direct high temperature fluid out of internal chamber 210 in response to the rotation of the first and second gears 202, 204. As will be appreciated by those of skill in the art, first gear 202 may be attached to shaft 114 so that when shaft 114 is driven to rotate (e.g., via a motor), the rotation of shaft 114 will drive a commensurate rotation of first gear 202. According to some embodiments, first gear 202 may be configured to interlock with second gear 204 such that second gear rotates in an opposite direction as first gear 202 in response to the rotation of first gear 202. For example, as shown in FIG. 2, if first gear 202 rotates in a clockwise manner, second gear 204 will be driven to rotate in a counterclockwise direction, such that the cogs of both gears 202, 204 may force liquid within the internal chamber 210 to displace from the fluid inlet 108 to the fluid outlet 110. As will be appreciated by those of skill in the art, the internal surfaces of internal chamber 210 may have a tendency to experience wear as the teeth of first and second gears 202, 204 rotate within internal chamber 210, so it may be advantageous to make body 102 from a material that is wear resistant at temperatures such as 1400° C. Accordingly embodiments of body 102 may be created from materials that remain brittle at 1400° C. Further, some embodiments of body 102 may include an internal chamber 210 with smooth polished surfaces to enable hydrodynamic film lubrication. In particular, embodiments of high temperature gear pump 100 may include a smooth shaft 114 and bearings 115, which may be hollow cylinders fitted around shaft 114 on both sides of the gears 202, 204.

According to some embodiments, one or more components of high temperature gear pump 100 may be made of a brittle material, such as for example, a high temperature metal like tungsten, as well as ceramics such as alumina, Shapal™, Hi-M (AlN with BN), hexagonal boron nitride, aluminum nitride, zirconia, silicon nitride, or silicon carbide, or metal such as Inconel® 625. In embodiments where components of high temperature gear pump 100 are made from metal, the metal may be coated with a coating that is brittle, such as CrN, ZrC, WC, SiC, or many other ceramics. For example, components that may come into contact with the high temperature fluid may be made of such a brittle material, including, body 102 (including the interior walls of internal chamber 210), faceplate 104, fluid inlet 108, fluid outlet 110, gland plate 112, first gear 202, and second gear 204. These brittle components may allow high temperature gear pump 100 to operate using high temperature fluid (e.g., high temperature tin) without degrading from thermal shock or thermal fatigue and may provide corrosion resistance. According to some embodiments, the brittle materials of high temperature gear pump 100 may be placed into compression using components (such as securing members 103) made out of a refractory metal to provide additional structural support.

High temperature gear pump 100 may provide further advantages by incorporating one or more of graphite, aramid, mica, fiberglass, or alumina-silicate as sealing materials. Alumina-silicate may advantageously operate continuously up to 1260° C. with excursions to 1650° C. in air. Graphite may operate up to 500° C. in air, due to oxidation, but may operate up to 3000° C. in a non-air environment, such as in an inert gas environment. Fiberglass may operate in temperatures up to approximately 600° C., after which point it may melt or become too soft. Mica and aramid may operate at temperatures of approximately 700° C. Graphite seals may be used in a non-oxidizing atmosphere up to 3000° C. Accordingly, in some embodiments, seal 106 between body 102 and faceplate 104 may be a graphite seal. Thus, in some embodiments, high temperature gear pump 100 may include a graphite layer between body 102 and faceplate 104 to create seal 106, which may prevent high temperature fluid from leaking out from between body 102 and faceplate 104 without the seal 106 melting, vaporizing, or otherwise decomposing upon being exposed to the high temperature fluid. According to some embodiments, seal 106 may be a static seal that is created using gasket compression. For example, in some embodiments, seal 106 may be a graphoil (graphite) sheet body seal that is compressed between a face of body 102 and a face of faceplate 104 by the compressive forces created by securing members 103, which may be, for example, tungsten bolts. It should be understood that the use of graphoil is merely exemplary and that any non-polycrystalline synthetic graphite, or any other type of graphite that is soft may be used. According to some embodiments, graphite reaction bonding may be used to form permanent static seals. According to some embodiments, reaction bonding may be used to create seals from other materials such as alumina, zirconia, SiC, and the like, and may not require the seal material to be soft. Forming seals using compression may be more reliable and removable than reaction bonds, although reaction bonded seals may be more compact and easier to customize.

In one embodiment, body 102, faceplate 104, fluid inlet 108, fluid outlet 110, gland plate 112, first gear 202, and second gear 204 of high temperature gear pump 100 may be made of a ceramic material and seal 106 may be a graphite seal. In another embodiment, body 102, faceplate 104, fluid inlet 108, fluid outlet 110, gland plate 112, first gear 202, and second gear 204 of high temperature gear pump 100 may be made of tungsten and seal 106 may be a graphite seal. Because tungsten may also withstand temperatures as high as 3000° C., a high temperature gear pump 100 made of tungsten components and graphite seals may be configured to operate at temperatures up to 3000° C. without experiencing any thermal degradation to the integrity of the gear pump. It will be appreciated that various combinations of brittle materials and seal materials described herein may be used for components of high temperature gear pump 100 and seals, respectively, and the specific embodiments described herein are merely exemplary.

According to some embodiments, a high temperature gear pump 100 and/or a valve of the current disclosure may use coatings to prevent any interaction of a base metal with a high temperature fluid. For example, a high temperature gear pump 100 may be made of a base metal such as steel or Inconel®, and the base metal may be coated with nitride or carbide coatings to prevent the base metal from corroding from a high temperature fluid. According to some embodiments, such coatings may enable corrosion resistance, but may not enable retention of thermal properties at high temperatures. Accordingly, the use of various metals may be temperature limited. For example, steel may be limited to use up to approximately 400° C., Inconel 625 may be limited to use up to approximately 600° C., and Inconel 740 may be limited to use up to approximately 740-800° C. According to some embodiments, refractory metals may be used above 1000° C. and use coatings to prevent corrosion.

Figure 3:
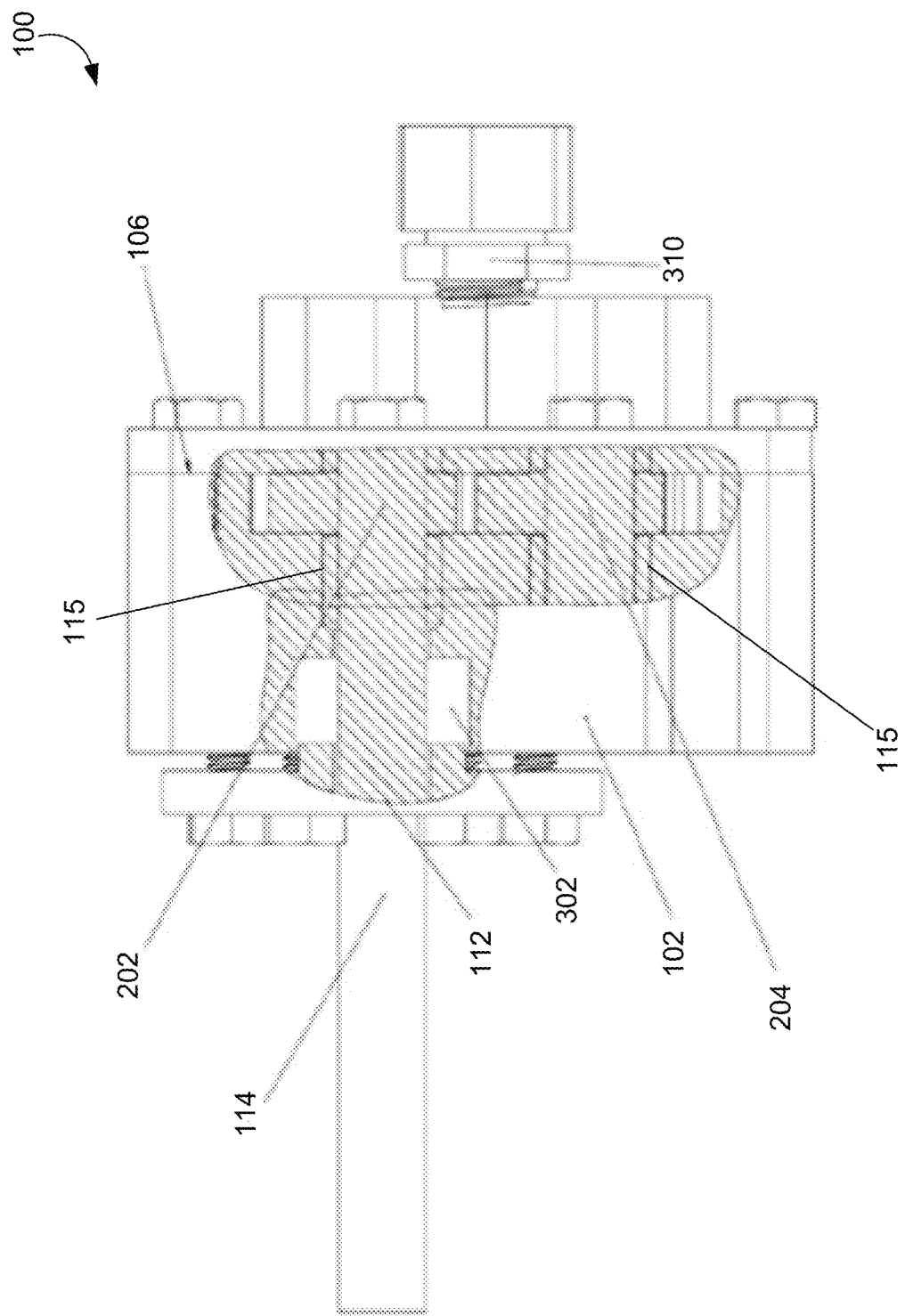
FIG. 3 is partial cross-sectional side view of a high temperature gear pump, according to an example embodiment.

As shown in FIG. 3, high temperature gear pump 100 may include a packing seal 302 that is positioned around a portion of shaft 114 that is internal to body 102 of high temperature gear pump 100. In some embodiments, packing seal 302 may be made of packing rope that is wrapped around shaft 114. According to some embodiments, packing seal 302 may be made of a soft graphite. As shown, in some embodiments, packing seal 302 may abut the rear internal face of body 102 such that it may provide a seal between the shaft 114 and the aperture of body 102 through which shaft 114 is disposed. According to some embodiments, and as more clearly shown in FIG. 7B with respect to gland plate 612, a portion of gland plate 112, such as an annular member that extends out of a flat plate portion of gland plate 612, may be positioned within the aperture of body 102 such that shaft 114 is encompassed by the annular member of gland plate 112 as it passes through the aperture of body 102. Accordingly, in some embodiments, gland plate 112 may be positioned such that it may come into contact with packing seal 302. In some embodiments, packing seal 302 may be constrained by gland plate 112 and body 102. In some embodiments, gland plate 112 may apply axial force to packing seal 302, which may cause packing seal 302 to expand in a circumferential direction to create a seal between shaft 114 and body 102. Although packing seal 302 may slowly erode over time as shaft 114 rotates against it, unlike other seals it may be tightened at intervals by to prevent leakage. According to some embodiments, packing seal 302 may be tightened by tightening bolts that secure gland plate 112 to body 102 so that gland plate 112 moves towards packing seal 302, thereby exerting an axial force on packing seal 302 causing it to expand radially. It should be appreciated that other methods of providing an axial force to packing seal 302 may be used to tighten packing seal using a component that deforms elastically, such as a spring or a Belleville washer, while continuing to deliver sufficient force so that gland plate 112 remain tight upon being repositioned closer to body 102.

Figure 4B:
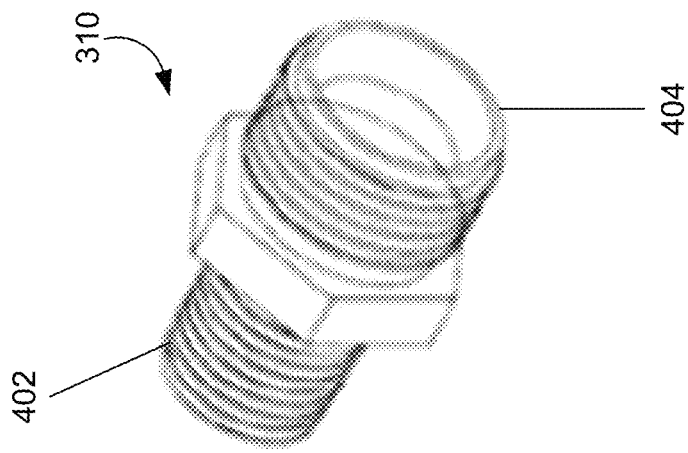
FIGS. 4A-4B are a side and a perspective view of a fluid connection adapter for a high temperature gear pump, according to an example embodiment.
Figure 4A:
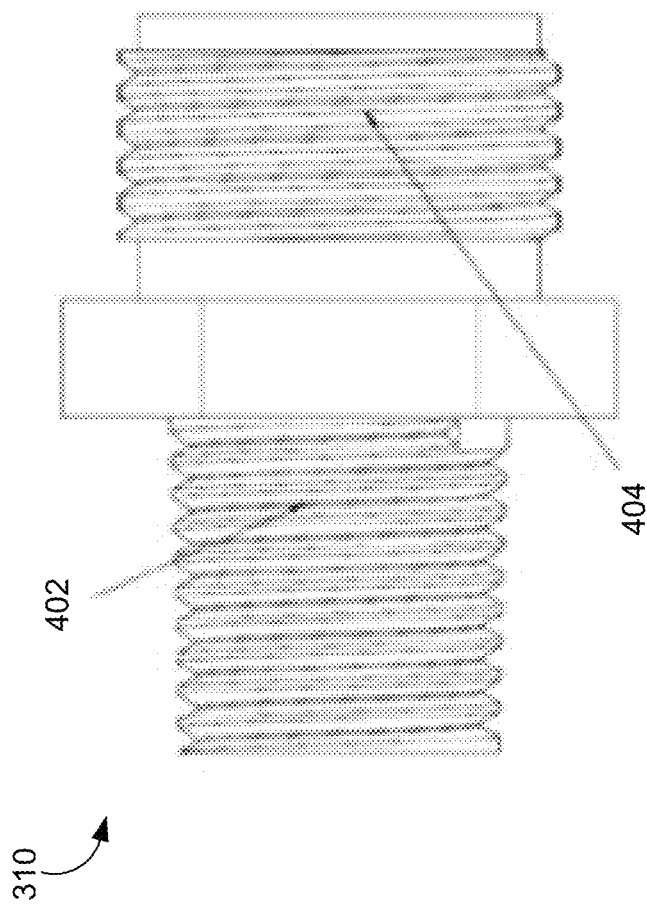

As shown in FIG. 3, and in more detail in FIGS. 4A-4B, high temperature gear pump 100 may include a fluid connection adapter 310 to create fluid inlet 108 and/or fluid outlet 110, according to some embodiments. According to some embodiments, fluid connection adapter 310 may have a tapered thread 402 configured to mate with a tapered thread of body 102 (not shown), such that fluid connection adapter 310 can be screwed into body 102. Fluid connection adapter 310 may also include a swage connection 404 for attaching fluid connection adapter 310 to brittle (e.g., ceramic) pipes via a soft ferrule, which may deform to create a seal, instead of the pipe itself deforming. According to some embodiments, fluid connection adapters 310 may be made of metals such as steel, Inconel 625, Inconel 740, or refractory metals such as Mo or W based alloys. According to some embodiments, a soft graphite ferrule may be used to attach fluid connection adapter 310 to piping. According to some embodiments, the graphite ferrule may provide a flexible seal that in addition to providing a reliable seal, may also compensate for different CTE of the pipe and the pump materials, thereby preventing leaks from mechanical failure or loose joints. Further, use of soft graphite ferrules may enable deformation without failure.

Although not shown, a motor that drives shaft 114 of high temperature gear pump 100 may be protected from the high temperatures presented by high temperature gear pump 100 by using a sufficiently long, uninsulated shaft 114. According to some embodiments, shaft 114 may be made from steel, tungsten, Inconel 625, Inconel 740, or a similar material. According to some embodiments and as described in greater detail below, shaft 114 may be connected to a motor using a lock-jaw coupling to accommodate CTE mismatch between shaft 114 materials. In some embodiments, a lock-jaw coupling may further serve to dampen the applied torque.

FIG. 5 shows a high temperature gear pump and motor system 500, according to an example embodiment. High temperature gear pump and motor system 500 may provide advantageous thermal isolation and shaft alignment properties that may allow the system 500 to operate at extremely high temperatures. As shown, high temperature gear pump and motor system 500 may include a high temperature gear pump 502, which may be similar to the design of high temperature gear pump 100 described with respect to FIGS. 1A-1B. For example, in some embodiments, high temperature gear pump 502 may utilize the same face seal (i.e., seal 106) and shaft seal (i.e., packing seal 302) as high temperature gear pump 100. In other words, in some embodiments, high temperature gear pump 502 may have a graphite seal between its faceplate and body and may have a graphite packing seal around the shaft that drives an internal gear. According to some embodiments, components of high temperature gear pump 502 may be made from a brittle material, such as a ceramic material, graphite, alumina, zirconia, silicon carbide, aluminum nitride, zirconium carbide, or silicon nitride, SiC, MgO, Al3C4, or other materials having similar properties. As shown and described in further detail with respect to FIGS. 6A-6C, high temperature gear pump 502 may include a pair of fluid connection adapters 504 for connecting a fluid inlet and a fluid outlet to piping (not shown). In a manner similar to that described above with respect to FIG. 2, the operation of high temperature gear pump 502 may be powered by the rotation of a shaft 505 that turns a gear positioned in an internal chamber of high temperature gear pump 502. In some embodiments, shaft 505 may be powered by motor 516. As shown in FIG. 5, according to some embodiments, shaft 505 may be connected to coupler 506 that may be a jaw-type coupler, such as a lock-jaw coupler, that is configured to interlock with a reciprocal coupler 507 of an insulating shaft 508. In some embodiments, coupler 507 may be a flexible coupler while coupler 506 may be a fully filleted tungsten sleeve bearing. The two couplers 506, 507 may be designed such that they may securely transfer torque, but in such fashion that they have space to accommodate thermal growth mismatch radially and a small amount of axial and angular misalignment. According to some embodiments, insulation shaft 508 may be vertically supported by a bearing mount 510 that includes an aperture through which insulating shaft 508 and/or coupler 507 may pass. In some embodiments, bearing mount 510 may allow insulating shaft 508 to be angularly flexible, but radially constrained. According to some embodiments, insulating shaft 508 may be connected to a motor shaft 114 by a flexible joint 512. According to some embodiments, flexible joint 512 may be configured to bend to accommodate a misalignment between motor shaft 114 and insulating shaft 508 caused by thermal growth of components of the system. For example, in some embodiments, flexible joint 512 may be a helical coupler, made from for example, stainless steel. In some embodiments, flexible joint 512 may be a cylinder with a helical cut that allows it to deform but still allows for the transfer of torque. According to some embodiments, high temperature gear pump 502 may be mounted on a pump base 518, as shown in FIG. 5.

During normal operation, high temperature gear pump 502 and pump base 518 may tend to reach extremely high temperatures due to their proximity and exposure to the high temperature fluid that flows through high temperature gear pump 502. By contrast, motor 516 may tend to stay relatively cool (e.g., close to ambient temperature) during normal operation, which may cause a significant thermal mismatch between the gear pump 502/pump base 518 and motor 516. The design of high temperature gear pump and motor system 500 may be advantageous because it provides thermal isolation of motor 516 (and other electrical components) from the extreme heat generated at high temperature gear pump 502. In other words, system 500 is designed to thermally isolate motor 516 and other electronics from the very high temperatures present at high temperature gear pump 502. This is accomplished by separating pump 502 and motor 516 in distance and by connecting the two using an insulating shaft 508 that restricts heat transfer from pump 502 to motor 508. According to some embodiments, insulating shaft 508 may be made from a material having low thermal conductivity. For example, according to some embodiments, insulating shaft 508 may be made from partially stabilized zirconia (PSZ), which has a very low thermal conductivity and is sufficiently strong to deliver the motor torque to pump 502. In some embodiments, insulating shaft 508 may be made from fully stabilized zirconia for use up to approximately 2000° C. or magnesia for use up to approximately 2800° C. In some embodiments, insulating shaft 508 may be made from tungsten. According to some embodiments, bearing and bearing mount 510 may also be made of PSZ. Thermal isolation is further achieved by use of pump base 518, which may be designed to be strong enough to secure high temperature gear pump 502 against motor torque and vibration, but may also have low thermal conductivity. In some embodiments, pump base 518 may be made from insulating, refractory, high strength material, such as, for example, andalusite AK-60, Shapal, graphite, alumina, zirconia, silicon carbide, aluminum nitride, zirconium carbide, silicone nitride, SiC, MgO, Al3C4, or calcium oxide-based cements. Pump 502 may be attached to pump base 518 using one or more securing members 519. According to some embodiments, securing members 519 may be made from tungsten, which may be advantageous because it may transition to ductile near 200° C. and has very high tensile stress, even at temperatures above 1400° C. Bolts and nuts made from a refractory material such as tungsten may be used to keep ceramic materials in compression and may accommodate thermal expansion by being made of a material with a lower expansion rate than clamped materials (e.g., pump base 518). In some embodiments, pump base 518 may be positioned on top of a cold plate 520, which may be a steel cooling plate that may protect the rest of the system from the heat of the high temperature gear pump 502. In this way, the design of high temperature gear pump and motor system 500 may significantly thermally isolate motor 516 and other electrical or control components from the high temperatures output by high temperature gear pump 502.

As described above, during normal operation, there may be a significant thermal mismatch between pump 502 and motor 516, due to the respective high/low temperatures at which each operates. For example, during high temperature operation, thermal expansion may cause gear pump 502 and/or bearing mount 510 to grow such that insulating shaft 508 is elevated above motor shaft 514 by a misalignment distance. In some embodiments, a misalignment distance caused by thermal expansion may be greater than 1 millimeter, which, absent techniques for accounting for the misalignment, may otherwise cause a severe failure of the system. To address this issue, the system 500 may be designed to accommodate a small amount of misalignment between high temperature gear pump 502 and the motor 516 by use of flexible joint 512 between insulating shaft 508 and motor shaft 514 in combination with couplers 506, 507. In some embodiments, flexible joint 512 may flex in the event of a misalignment, allowing insulating shaft 508 and motor shaft 514 to continue to operate without failure. Further, the lock-jaw coupling may accommodate different thermal growth between shaft 505/coupler 506 and insulating shaft 508/coupler 507, which may have highly different CTEs. In some embodiments, shaft 505 and coupler 506 may be made from, for example, Shapal™ Hi-M, graphite, alumina, zirconia, silicon carbide, aluminum nitride, zirconium carbide, silicon nitride, SiC, MgO, Al3C4, andalusite Ak-60, and calcium oxide-based cements. In some embodiments, insulating shaft 508 and coupler 507 may be made from partially stabilized zirconia, fully stabilized zirconia, magnesia, or tungsten.

According to some embodiments, a second approach to solving issues of misalignment caused by thermal expansion of pump system 500 may be to offset the height of motor 516 such that it sits slightly higher than high temperature gear pump 502, so that when the system is operating within a target temperature range (e.g., 300-1350° C.), the misalignment between motor 516 and high temperature gear pump 502 is minimized because pump 502 and insulating shaft 508 will rise towards the previously elevated level of motor 516. Accordingly, in some embodiments, motor 516 may be positioned slightly higher than high temperature gear pump 502, such that motor shaft 514 is slightly higher than shaft 505 relative to the ground. For example, according to some embodiments, a motor 516 may be positioned approximately 0.5-1.00 mm above high temperature gear pump 502, although it should be understood that the increase in the elevation of the motor 516 above the high temperature gear pump 502 may depend on the target operational temperature of high temperature gear pump 502. Alternatively, in some embodiments, motor 516 may be positioned on a vertically adjustable surface so that the height of motor 516 may be adjusted to alleviate misalignment due to thermal expansion. According to some embodiments, high temperature gear pump and motor system 500 may include an actuator and controller that may cause the height of motor 516 to be automatically adjusted to eliminate or alleviate misalignment issues caused by thermal expansion.

Figure 6A:
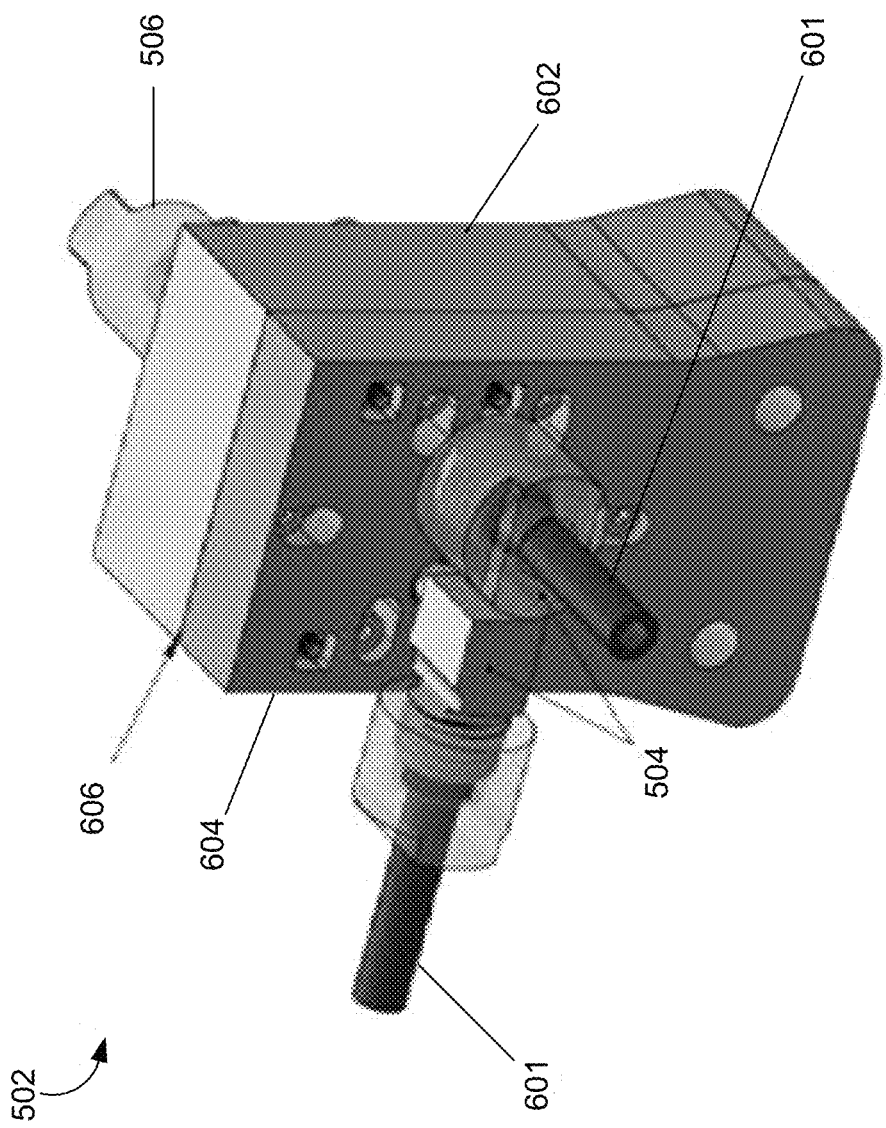
FIGS. 6A-6B are front and rear perspective views of a high temperature gear pump, according to an example embodiment.
Figure 6B:
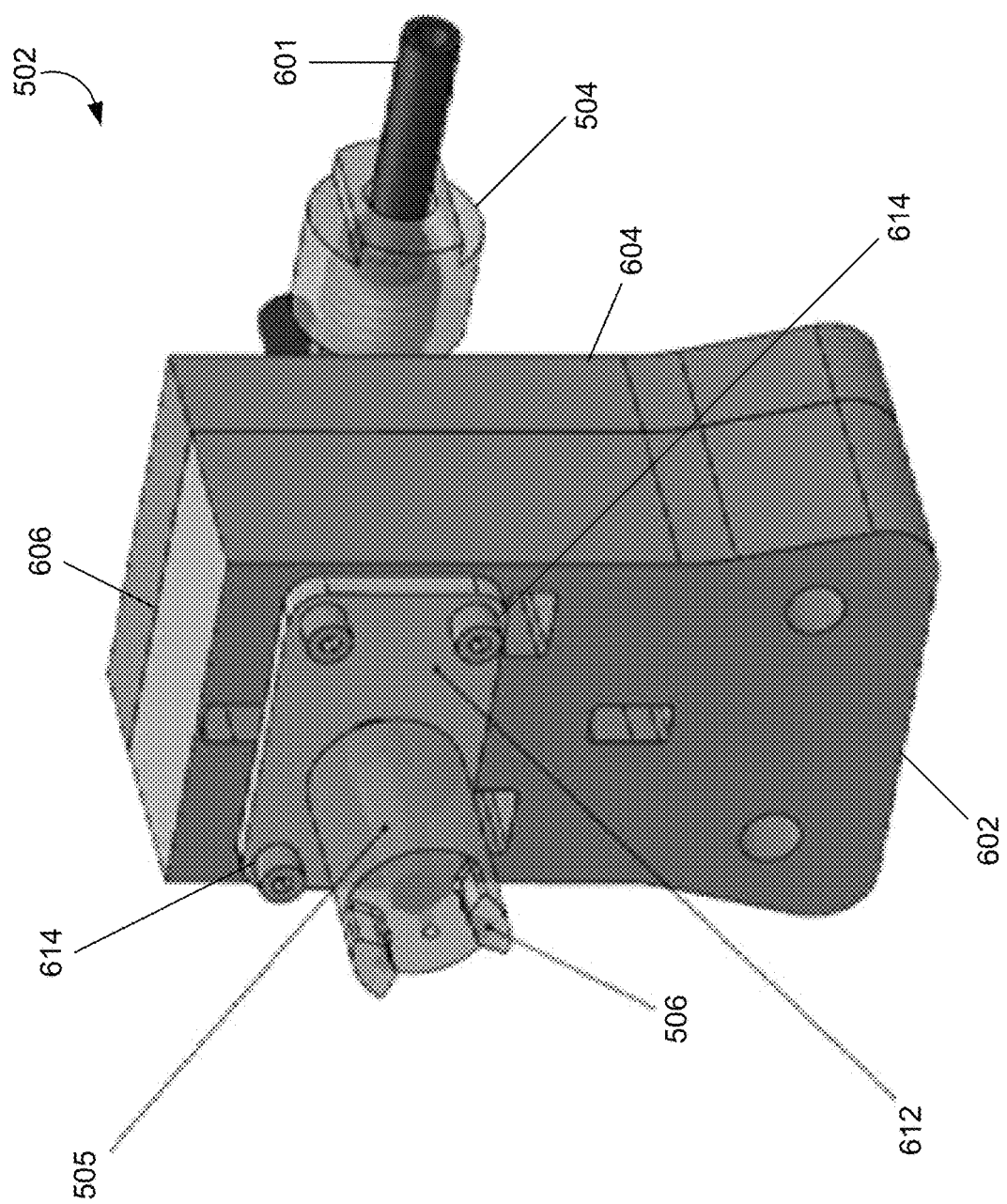
Figure 6C:
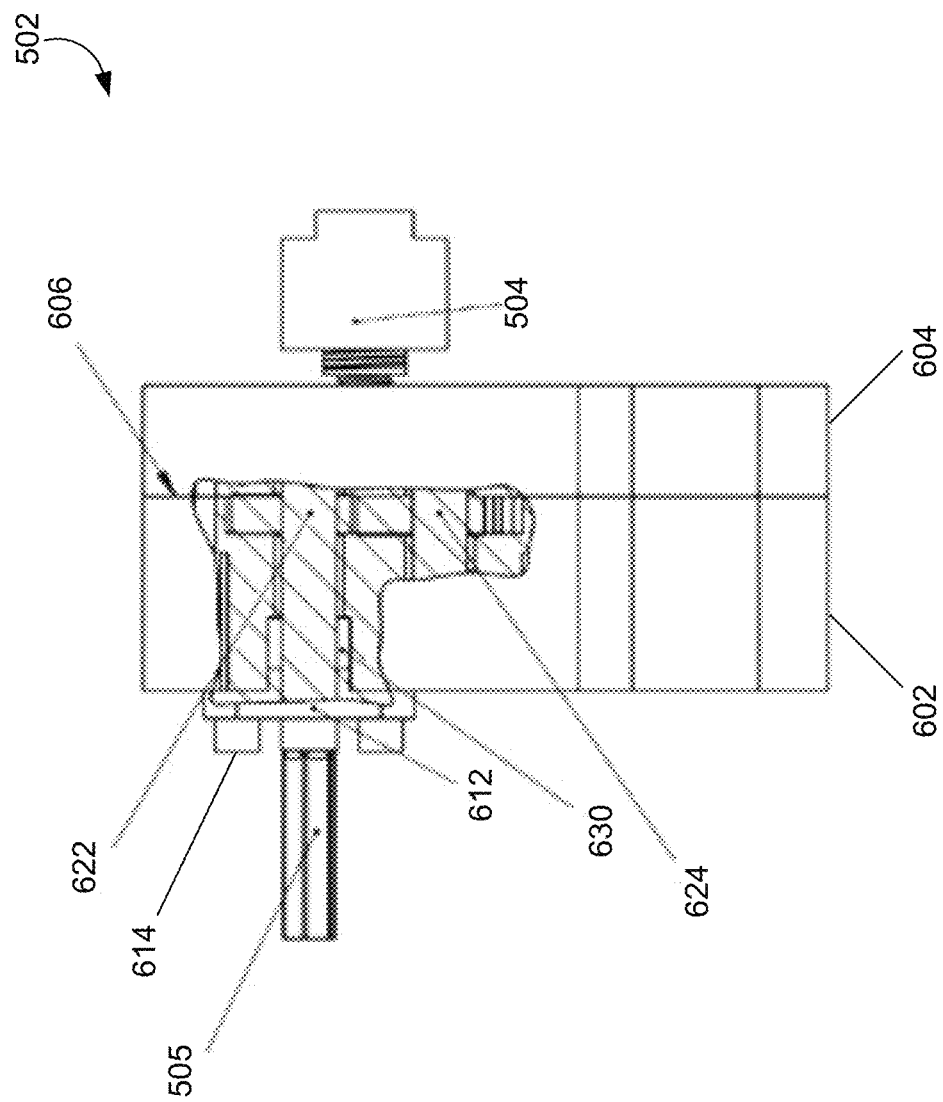
FIG. 6C is a partial cross-sectional side view of a high temperature gear pump showing the fluid path, according to an example embodiment.

As shown in FIGS. 6A-6C, embodiments of high temperature gear pump 502 may include a pair of fluid connection adapters 504 that may connect a fluid inlet and a fluid outlet to a pair of pipes 601. According to some embodiments, pipes 601 may be made of a ceramic material. High temperature gear pump 502 may include a faceplate 604 attached to a body 602 which encompasses a pair of gears, similar to high temperature gear pump 100. According to some embodiments a seal 606, which may be a graphite seal, may be disposed between faceplate 604 and body 602 to prevent leakage of fluid. High temperature gear pump 502 may include a gland plate 612 that has an aperture which may receive shaft 505. In some embodiments, gland plate 612 may be attached to body 602 by securing members 614, which may be, for example bolts, pins, screws, or the like. According to some embodiments, securing members 614 may be made of tungsten. As described previously above, in some embodiments, shaft 505 may have a jaw type coupler 506 that is configured to engage a reciprocal coupler 507 of insulating shaft 508. As shown in FIG. 6C, high temperature gear pump 502 may include first gear 622 that is attached to shaft 505, and a second gear 624 having cogs that are configured to rotatably engage with cogs of first gear 622. In some embodiments, high temperature gear pump 502 may include a packing seal 630, similar to the packing seal 302 described above with respect to FIG. 3. Packing seal 630 may be a dynamic seal that may seal a rotating component, such as a shaft.

As shown in greater detail in FIGS. 7A-7B, in some embodiments, when axial forces 702 are applied to gland plate 612, by, for example tightening securing members 614, packing seal 630 may expand in a radial direction to press compliantly against the sealing surfaces 704. Accordingly, packing seal 630 may create a seal between shaft 505 and body 602 as shown in FIG. 7B. Gland plate 612 may comprise a substantially flat plate that may be positioned adjacent to a surface of body 602. According to some embodiments, gland plate 612 may also comprise an annular protrusion 710 extending out of the substantially flat plate. In some embodiments, the annular protrusion 710 may be configured to be received by an aperture of body 602. According to some embodiments, the annular protrusion 710 of gland plate 612 may be configured to receive shaft 505 as shown in FIG. 7B. Further, according to some embodiments, the annular protrusion 710 of gland plate 612 may be configured to substantially occupy an aperture of body 602 and extend into the interior of body 602. In some embodiments, the degree or distance to which annular protrusion 710 extends within body 602 may be adjusted by tightening or loosening gland plate 612 against the surface of body 602, by for example, tightening or loosening attachment members 614. According to some embodiments, as shaft 505 rotates, packing seal 630 may rotate along with shaft 505 at sealing surface 704 to create a dynamic seal between shaft 505 and gland plate 612.

FIGS. 8A-8B show a sealing technique that may be used in an association with a fluid connection adapter 504 to seal two stationary pipes together or to seal a pipe to a high temperature gear pump 502. According to some embodiments, a fluid connection adapter 504 may include a first thread 802 for attaching to faceplate 604 of high temperature gear pump 502 and a second thread 803 for receiving a nut 804 that secures a pipe 808 to the second thread 803. For example, first thread 802 may be configured to screw into a thread of faceplate 604 at a fluid inlet or a fluid outlet in communication with an internal chamber of body 602. First and second threads 802, 803 may include a hollow internal passage that may allow high temperature fluid to flow through. According to some embodiments, as shown in FIG. 8B, second thread 803 may have a larger diameter than first thread 802 and may be configured to receive a pipe 808 via an aperture. In some embodiments, the aperture of second thread 803 may taper inwards. According to some embodiments, pipe 808 may include a ferrule 806 on the end that is configured to be received by second thread 803. In some embodiments, ferrule 806 may be made of graphite that may expand radially when compressed axially. Accordingly, in some embodiments, a seal may be formed by inserting the end of pipe 808 having the ferrule into the aperture of second thread 803 and applying an axial force 805 to pipe 808 to snuggly insert it into the hollow interior of second thread 803. According to some embodiments, as the axial force 805 is applied, the graphite ferrule 806 may expand radially in at the sealing surface shown in FIG. 8B, thereby creating a form-fitting seal which may seal pipe 808 to fluid connection adapter 504 to prevent leakage of any high temperature fluid flowing from pipe 808 to pump 502 via the fluid connection adapter 504. In some embodiments, a nut 804 may be used to secure pipe 808 to second thread 803. According to some embodiments, nut 804 may be integral with pipe 808 to form one piece that may be screwed into second thread of fluid connection adapter 504. In some embodiments, nut 804 may be made of graphite to provide a further seal around second thread 803. According to some embodiments, fluid connection adapter 504 may include oversized parts to accommodate the use of brittle materials such as ceramics.

Figure 9:
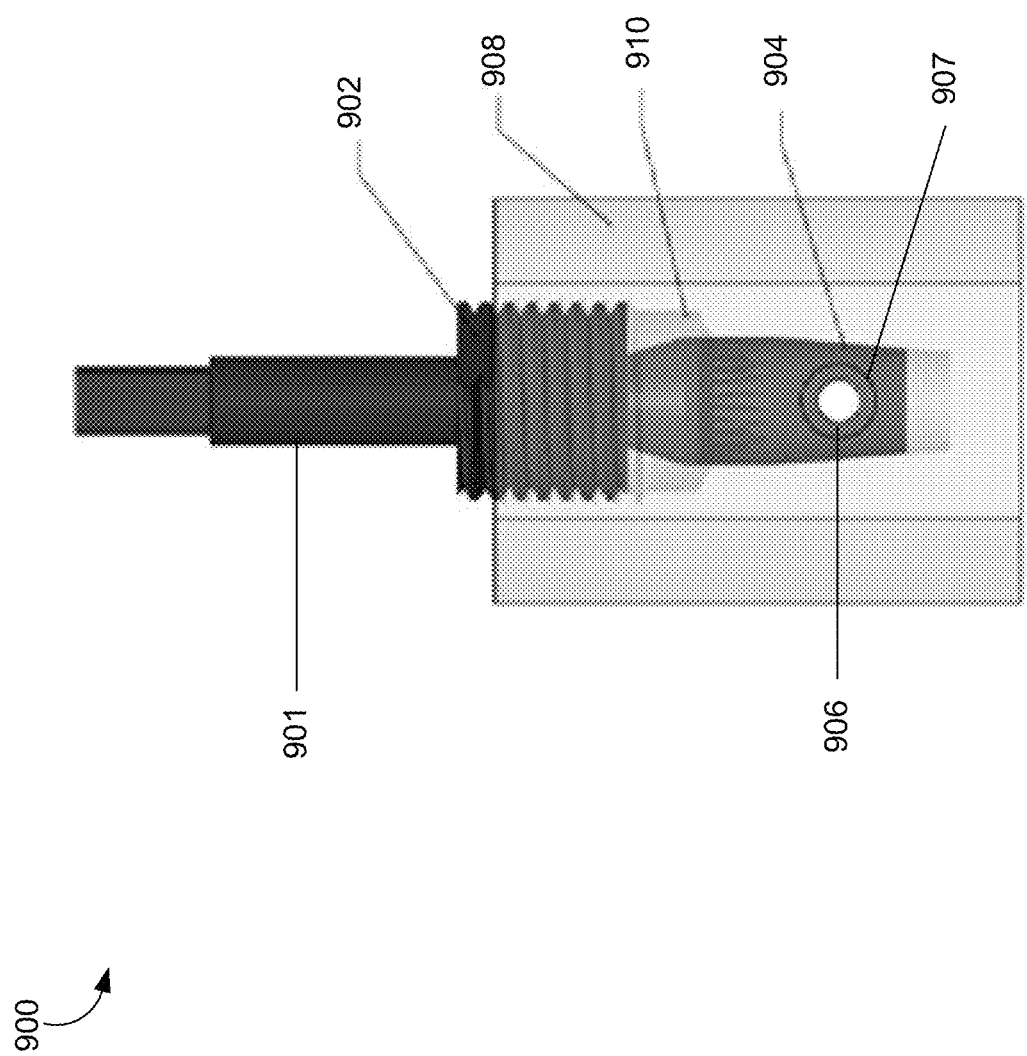
FIG. 9 is a cross-sectional side view of a body of a high temperature plug valve, disposed to show an internally positioned plug, according to an example embodiment.
Figure 10:
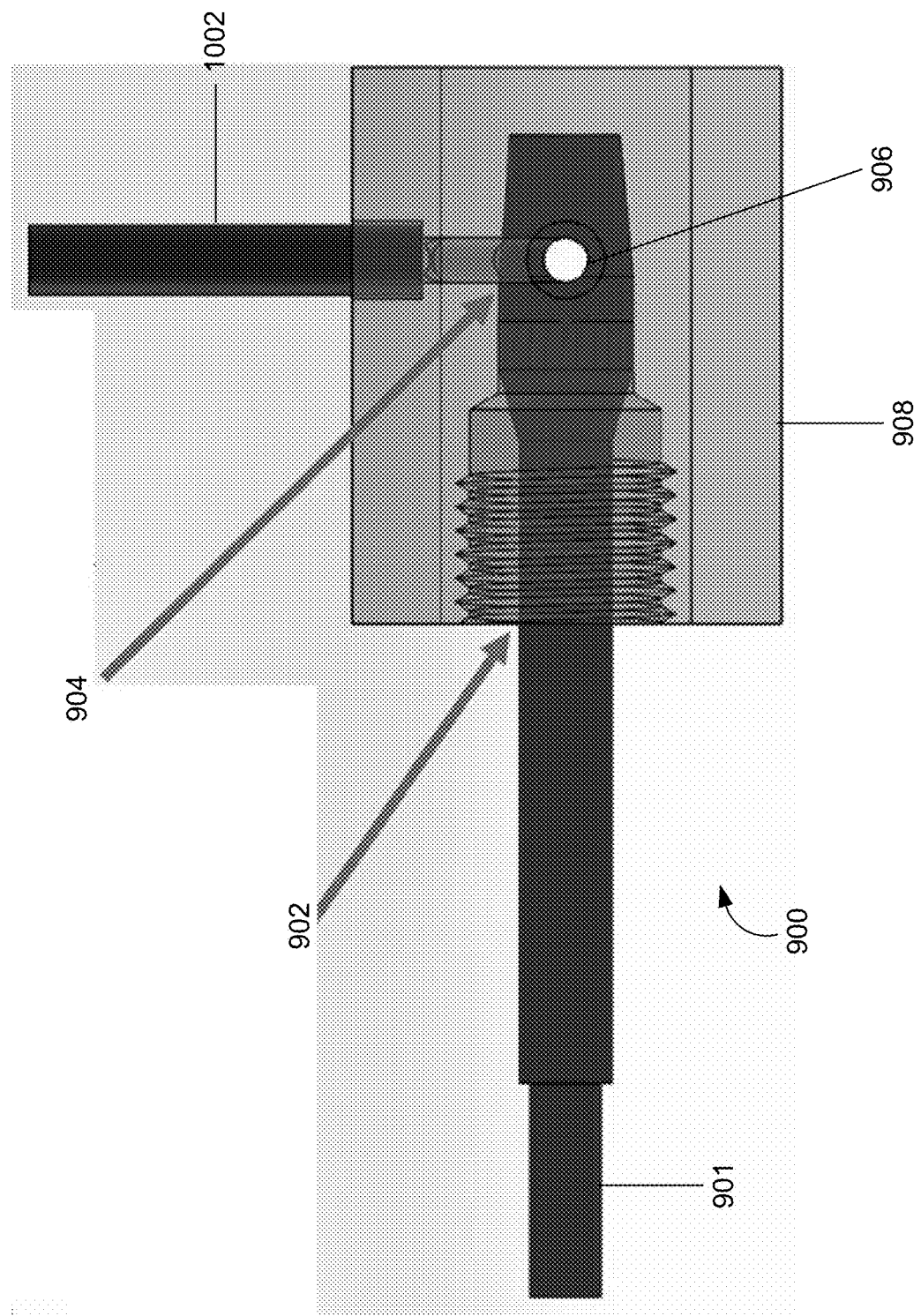
FIG. 10 is a cross-sectional side view of a body of a high temperature plug valve, disposed to show an internally positioned plug connected to a pipe, according to an example embodiment.

FIGS. 9 and 10 shows an example embodiment of a high temperature plug valve 900 that may be used to control the flow of high temperature fluids, such as liquid tin. High temperature plug valve 900 may include a valve body 908 having a hollow chamber that is configured to receive a tapered stem plug 904 having an aperture 906. Valve body 908 may include an aperture 907 that is concentric with the aperture 906 of tapered stem plug 904 when the valve 900 is switched to an open position to allow fluid to pass through the valve body 908 to a pipe 1002, as shown in FIG. 10. Tapered stem plug 904 may be connected to a plug shaft 901 that, when rotated, may cause the rotation of tapered stem plug 904. As will be appreciated of those of skill in the art, valve 900 may be opened by rotating tapered stem plug 904 to align its aperture 906 with the aperture 907 of the valve body 908 or close the valve 900 by rotating tapered stem plug 904 so that the apertures are not aligned (e.g., by rotating tapered stem plug 904 ninety degrees so there is no overlap between the two apertures 906, 907). High temperature plug valve 900 may include a packing nut 902 that may be configured the allow tapered stem plug 904 to be securely screwed into valve body while accommodating rotation of the tapered stem plug 904. According to some embodiments, packing nut 902 may serve to push tapered stem plug 904 downwards to reduce leak paths around the plug. High temperature plug valve 900 may include a packing seal 910 that when compressed by a downward force from packing nut 902, may expand radially to form a seal between tapered stem plug 904 and the chamber of valve body 908 to prevent fluid from leaking. According to some embodiments, packing seal 910 may be made from packing rope wound around tapered stem plug 904. According to some embodiments, the packing rope may be made of a soft and compressible graphite. According to some embodiments, a flat portion between packing seal 910 and the taper of tapered stem plug 904 may help tapered stem plug maintain an axial position with respect to valve body 908 and reduce erosion at the tapered position.

Since high temperature plug valve 900 does not have continuously rotating parts, it may have less wear, allowing the use of brittle and erodible materials for its construction. According to some embodiments, some or all of the plug shaft 901, packing nut 902, tapered stem plug 904, valve body 908, and packing seal 910 may all be made out of the same material, which may advantageously reduce leaks due to CTE mismatches between different materials. According to some embodiments, high temperature plug valve 900 may be made entirely out of a single brittle material, such as graphite, alumina, zirconia, silicon carbide, aluminum nitride, zirconium carbide, or silicon nitride, SiC, MgO, and Al3C4. In some embodiments, the components of high temperature plug valve 900 may be made out of a combination of different brittle materials. According to some embodiments, the components of high temperature plug valve 900 may be made out of components that are configured to fit together loosely at a first temperature and then fit together more tightly at a target temperature range.

According to some embodiments, both high temperature plug valve 900 and high temperature gear pump 502 may be designed to accommodate the particular properties of brittle materials. For example, the designs may address the problems of the fragility and brittleness of graphite, ceramics, and refractory metals by designing one or more parts of the valve 900 and/or pump 502 for robustness and strength in operation by utilizing extra thick walls and extra-large dimensions of parts. According to some embodiments, a high temperature pump 502 may have a body 602 that contains no thin walls. By increasing the thickness and increasing the radius of one or more parts of the pump 502 and valve 900, the parts may be fortified and strengthened. Further, using parts that have a shorter length to width ratio may further provide reinforcement to brittle materials that may be used as parts in the pump 502 and/or valve 900. According to some embodiments, pump shaft 505 diameter can be maximized so that it is equal to the dedendum circle diameter (i.e., tooth base), such that it may be approximately twice the diameter of a shaft used in a conventional application. Gears of a high temperature pump (e.g., such as gears 202, 204 or equivalent gears in pump 502) may have a low number of teeth such that tooth thickness may be large. For example, in some embodiments, a gear of a high temperature pump 502 may have seven to nine teeth so that undercutting into the dedendum may not be needed and sufficient contact ratio (i.e., the average number of teeth engaged) is maintained. In some embodiments, the coupling of ceramic shafts may not use keyway or setscrew, but may instead use a form of large fillet splices. A high temperature valve 900 may have a very large (e.g., approximately 2 inch) thread 902 to screw in the valve plug 904.

Figure 11:
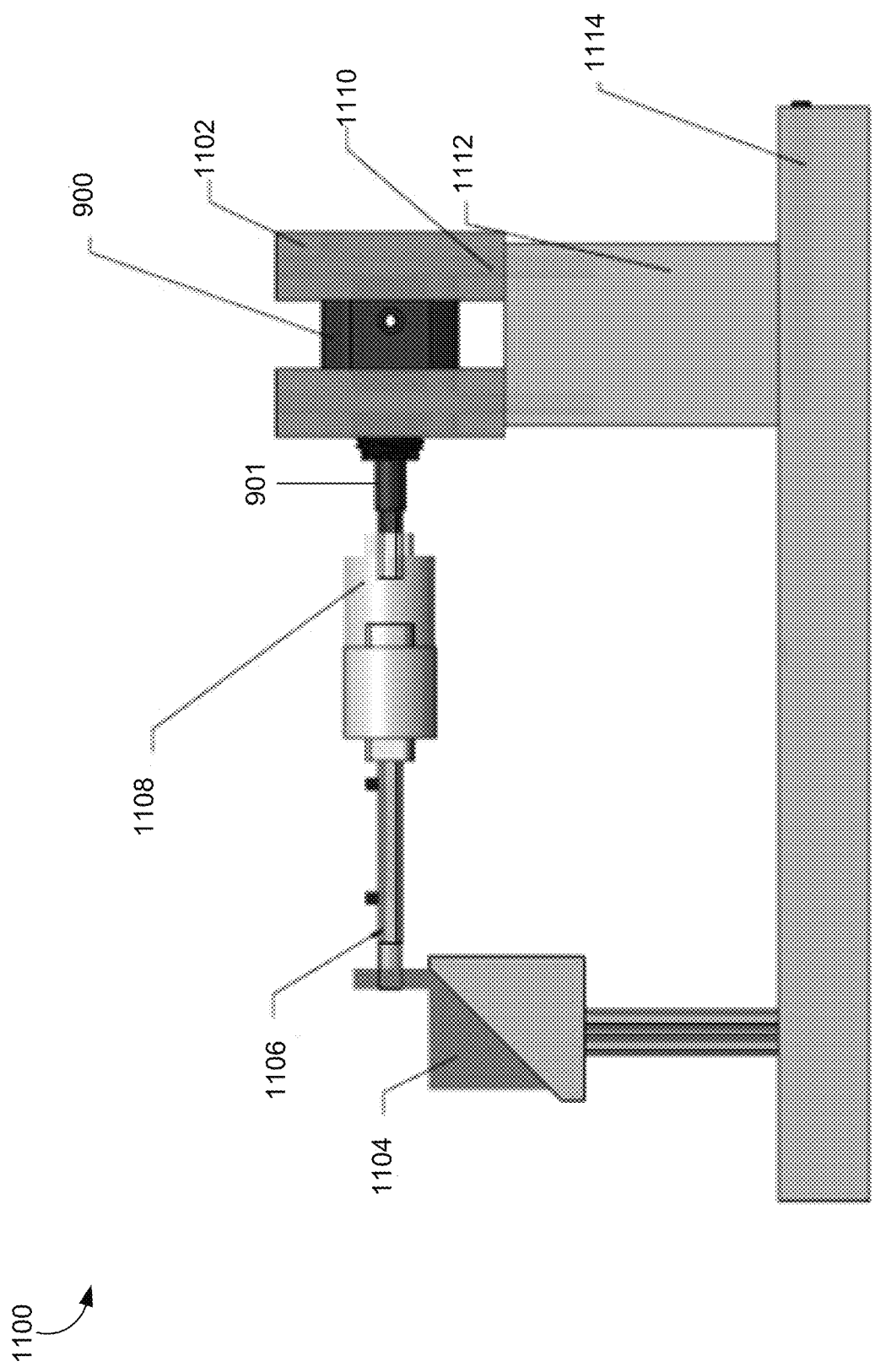
FIG. 11 is side view of a high temperature valve control system, according to an example embodiment.
Figure 12:
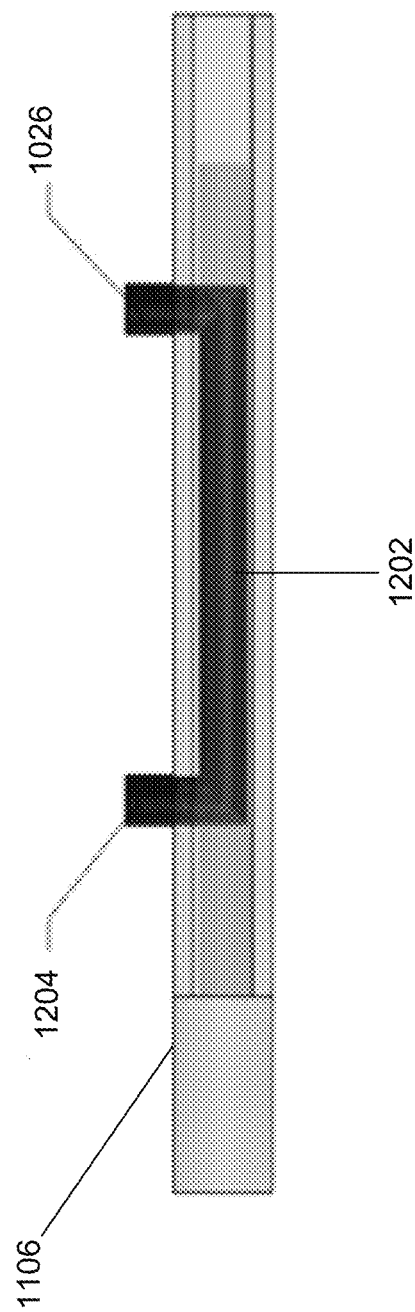
FIG. 12 is a cross-sectional side view of a shaft cooling system, according to an example embodiment.

FIG. 11 shows a high temperature valve control system 1100, according to an example embodiment. High temperature valve control system 1100 may be a system for controlling a high temperature plug valve 900, as described above with respect to FIG. 9. For example, a high temperature plug valve 900 may be rotated between an open and closed position by rotating plug shaft 901 using an actuator 1104. The actuator 1104 may be connected to a shaft 1106 which may be coupled to plug shaft 901 via a coupler 1108. In some embodiments, shaft 1106 may be a steel shaft and coupler 1108 may be made of andalusite. Actuator 1104 may be configured to selectively rotate shaft 1106 clockwise and counterclockwise to selectively open and close the valve 900. High temperature plug valve 900 may be secured by supports 1102, which may be, for example andalusite bricks having apertures configured to securely engage valve body 908. In some embodiments, supports 1102 may be securely positioned on top of a base 1112 by, for example, inserting dowel pins 1110 attached to supports 1102 into base 1112. In some embodiments, dowel pins may be made of, for example, a molybdenum based alloy known as titanium zirconium molybdenum (TZM). According to some embodiments base 1112 may be, for example, alumina castable cement. In some embodiments, base 1112 may sit atop a cooling plate 1114. Temperature valve control system 1100 may be constructed using materials that have low conductivity to reduce the amount of heat conduction to other parts of the system 1100. In general, andalusite is resistant to thermal gradients and thus may be a good coupler between hot graphite (e.g., of high temperature valve 900) and cold steel (e.g., of shaft 1106). Heat may also be removed from the system using cooling plate 1114, as well as a shaft cooling system that may be used in conjunction with shaft 1106. As shown in FIG. 12, shaft 1106 may include a hollow channel with an inlet 1204 and an outlet 1206 through which may receive a flow of coolant oil that may remove heat from the system through the axis of shaft 1106. Cooling shaft 1106 may lower the temperature at actuator 1104 to ensure its safe operation.

Figure 13:
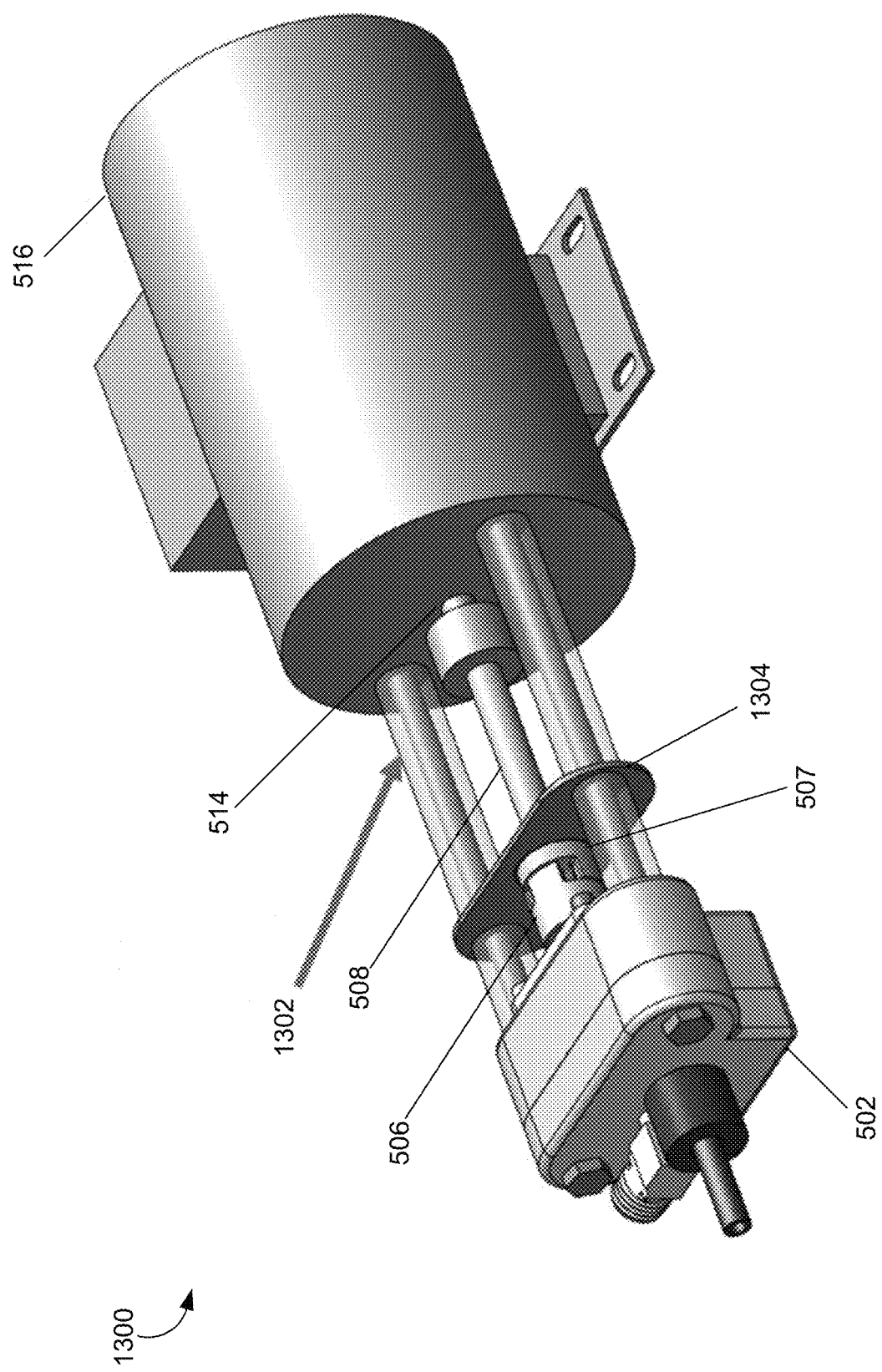
FIG. 13 is perspective view of an alternative design of a high temperature pump, according to an example embodiment.

FIG. 13 shows an alternate embodiment of a pump system 1300 that may be used in conjunction with the pipes, valves, and seals described herein. The design of pump system 1300 may avoid shaft misalignment issues due to thermal expansion by mounting the motor 516 to the pump 502 symmetrically about the drive shaft (i.e., motor shaft 514, insulating shaft 508, and pump shaft 505). In this way, thermal expansion is symmetric about the plane of the drive shaft and bolts, so that it has no effect on alignment. Axial expansion is accommodated by jaw type, or splined couplers 506 used to connect the insulating shaft 508 to the pump shaft 505. In some embodiments, a splined coupler may have no sharp edges. In some embodiments, motor 516 may be attached to pump 502 by two mounting rods 1302 on either side of insulating shaft 508 that connects to pump shaft 505 via a one or more couplers 506. The mounting rods 1302 and insulating shaft 508 may then be axially restricted by a bearing mount 1304 that includes apertures that receive mounting rods 1302 and insulating shaft 508, as shown in FIG. 13. According to some embodiments, the aperture of bearing mount 1304 configured to receive insulating shaft 508 may be smooth such that it allows for insulating shaft 508 (including any coupler it may have) to freely rotate. According to some embodiments, bearing mount 1304 may be made of any metal or ceramic, depending on how far away from pump 502 it is located. In some embodiments, bearing mount may be made from, for example but without limitation, tungsten, zirconia, alumina, SiC, MgO, Al3C4, aluminum nitride, zirconium carbide, silicon nitride with Sn, Ga, In, Si, Al, Fe, or Ni, Inconel, Shapal, graphite, andalusite Ak-60, and calcium oxide-based cements. In some embodiments, mounting rods 1302 may be made of a refractory metal such as, for example, tungsten, molybdenum, or rhenium. According to some embodiments, mounting rods 1302 may be surrounded by another material that is compressed to provide rigidity. According to some embodiments, the surrounding material may be the same material that pump base 518 is made from, which preferably has a low thermal conductivity. For example, the material surrounding mounting rods 1302 may be andalusite Ak-60, Shapal, graphite, alumina, zirconia, silicon carbide, aluminum nitride, zirconium carbide, silicon nitride, SiC, MgO, Al3C4, calcium oxide-based cements, partially stabilized zirconia, fully stabilized zirconia, magnesia, or tungsten.

Further, although embodiments of the disclosure are generally directed towards systems and devices for pumping and controlling high temperature fluids constructed from brittle materials, which may be liable to break or shatter, it is contemplated that these parts and materials may be strengthened and given additional structural support by enclosing components in a refractory metal support rings for high pressure applications. For example, brittle pipes and joints may be enclosed in rings made from tungsten, steel, nickel, or molybdenum for support, external to insulation.

While certain embodiments of the disclosed technology have been described in connection with what is presently considered to be the most practical embodiments, it is to be understood that the disclosed technology is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the disclosed technology, including the best mode, and also to enable any person skilled in the art to practice certain embodiments of the disclosed technology, including making and using any devices or systems and performing any incorporated methods. The patentable scope of certain embodiments of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

We claim:
1. A pump comprising:
   pump components comprising:
      a pump body made at least in part by a first brittle material;
      a seal comprised of a second brittle material;
      a first plate;
      a second plate comprising:
         a fluid inlet; and
         a fluid outlet;
      a shaft; and
      securing members;
   wherein the pump body comprises:
      a closed face having an aperture for receiving a shaft;
      an open face;

a chamber disposed between the closed face and the open face, the chamber having a first side, a second side, and housing at least a first gear; and a first plurality of apertures for receiving the securing members;

wherein the first plate is positioned externally to the closed face of the pump body, and having an aperture for receiving a shaft;

wherein the second plate is attached to the pump body at the open face such that the chamber is enclosed, and the fluid inlet is in communication with the first side of the chamber and the fluid outlet is in communication with the second side of the chamber;

wherein the first gear is attached to the shaft;

wherein the first plate is made of one of the first brittle material and a refractory metal, and has a second plurality of apertures for receiving the securing members; and wherein the second plate is made of the first brittle material;

wherein the securing members are made of a refractory metal and are disposed in the first and second plurality of apertures to secure the first plate to the pump body;

wherein the seal is disposed between the pump body and the second plate; and wherein the pump is configured to operate at temperatures between 500° C. and 3000° C.

2. The pump of claim 1 further comprising a second gear housed within the chamber, the second gear comprises a plurality of teeth with a full radius fillet dedendum.

3. The pump of claim 2, wherein the first gear comprises a plurality of teeth with a full radius fillet dedendum, and wherein the first gear and second gear are configured to rotatably engage each other.

4. The pump of claim 1, wherein the refractory metal is tungsten; and wherein the seal is a graphite sheet.

5. The pump of claim 1, wherein the pump components further comprise a packing seal positioned around a portion of the shaft positioned within the chamber to form a seal between the shaft and an internal surface of the pump body.

6. The pump of claim 5, wherein the packing seal is configured to be tightened in response to a tightening of at least a portion of the securing members.

7. The pump of claim 5, wherein the packing seal comprises packing rope wrapped around the shaft; and wherein the packing rope comprises a soft and compressible graphite.

8. The pump of claim 1, wherein the pump components include stationary pump components and moveable pump components;

wherein the pump components further comprise a second seal comprising the second brittle material;

wherein the seal is a static seal; and wherein the second seal is a dynamic seal located between at least a portion of two adjacent moveable pump components.

9. A pump comprising:
pump components comprising:
a pump body made at least in part by a first brittle material;
a first plate;
a second plate comprising:
a fluid inlet; and
a fluid outlet; and a fluid connection adapter attached to the second plate, the fluid connection adapter being made of a brittle material and comprising:
a first thread configured to be attached to the fluid inlet or fluid outlet, the first thread being hollow; and
a second thread comprising:
an aperture configured to receive the end of a pipe having a graphite ferrule that is configured to expand radially to form a seal between the pipe and the second thread in response to an axial force; and
threading configured to receive a nut;

wherein the pump body comprises:
a closed face having an aperture for receiving a shaft;
an open face; and
a chamber disposed between the closed face and the open face, the chamber having a first side, a second side, and housing at least a first gear;

wherein the first plate is positioned externally to the closed face of the pump body, and having an aperture for receiving a shaft;

wherein the second plate is attached to the pump body at the open face such that the chamber is enclosed, and the fluid inlet is in communication with the first side of the chamber and the fluid outlet is in communication with the second side of the chamber; and wherein the pump is configured to operate at temperatures between 500° C. and 3000° C.

10. The pump of claim 9, wherein the pump components further comprise a seal comprised of a second brittle material.

11. The pump of claim 9, wherein the pump components include stationary pump components and moveable pump components;

wherein a static seal comprised of a second brittle material is located between at least a portion of two adjacent stationary pump components; and wherein a dynamic seal comprised of the second brittle material is located between at least a portion of two adjacent moveable pump components.

12. The pump of claim 9 further comprising a second gear housed within the chamber, the second gear comprises a plurality of teeth with a full radius fillet dedendum.

13. The pump of claim 12, wherein the first gear comprises a plurality of teeth with a full radius fillet dedendum, and wherein the first gear and second gear are configured to rotatably engage each other.

14. The pump of claim 9, wherein the pump components further comprise a packing seal positioned around a portion of the shaft positioned within the chamber to form a seal between the shaft and an internal surface of the pump body.

15. The pump of claim 14, wherein the packing seal is configured to be tightened in response to a tightening of at least a portion of the securing members;

wherein the packing seal comprises packing rope wrapped around the shaft; and wherein the packing rope comprises a soft and compressible graphite.

16. A pump and motor system comprising:
a pump comprising:
pump components comprising:
a pump body made at least in part by a first brittle material;
a first plate;
a second plate comprising:
a fluid inlet; and a fluid outlet;
wherein the pump body comprises:
   a closed face having an aperture for receiving a shaft;
   an open face; and
   a chamber disposed between the closed face and the open face, the chamber having a first side, a second side, and housing at least a first gear;
wherein the first plate is positioned externally to the closed face of the pump body, and having an aperture for receiving a shaft;
wherein the second plate is attached to the pump body at the open face such that the chamber is enclosed, and the fluid inlet is in communication with the first side of the chamber and the fluid outlet is in communication with the second side of the chamber; and
wherein the pump is configured to operate at temperatures between 500° C. and 3000° C.; and
a motor configured to operate at temperatures between 0° C. and 300° C.;
an insulating shaft that mechanically connects the pump to the motor;
a motor shaft attached to the motor;
the insulating shaft positioned between a pump shaft and the motor shaft, the insulating shaft comprising a second coupler configured to rotatably engage a first coupler of the pump shaft;
a flexible joint that attaches the insulating shaft to the motor shaft; and
a bearing mount comprising a plate with an aperture configured to support the insulating shaft, wherein the bearing mount enables insulating shaft to be angularly flexible but axially constrained;
wherein the first gear is attached to a pump shaft extending out of a body of the pump, and the pump shaft terminates in the first coupler; and
wherein the pump is distanced from the motor such as to thermally isolate the pump from the motor such that the motor operates in its temperature range while the pump simultaneously operates in its temperature range.

17. The pump and motor system of claim 16, wherein the pair of engaged couplers are jaw type couplers that are configured to accommodate thermal growth mismatch radially and axial and angular misalignment.

18. The pump and motor system of claim 16, wherein the pump components further comprise:
   a plurality of attachment members made from a refractory metal;
   a graphite seal; and
   a graphite packing seal.

19. The pump and motor system of claim 16 further comprising:
   a pump base configured to support the pump and the bearing mount, the pump base made of an insulating, refractory, high strength material; and
   a cold plate positioned adjacent to the pump base.

20. The pump and motor system of claim 16, wherein the flexible joint is configured to bend to accommodate a misalignment between the motor shaft and the insulating shaft caused by thermal growth of components of the system.

21. The pump and motor system of claim 16, wherein the motor is positioned relative to the pump such that the motor shaft exits the motor at first height and the pump shaft exits the pump at a second height, the first height being higher than the second height.

22. The pump and motor system of claim 16, wherein the first gear comprises a plurality of teeth with a full radius fillet dedendum, and wherein the first gear configured to rotatably engage with another gear.

* * * * *